(12) United States Patent
Salah et al.

(10) Patent No.: US 11,736,193 B2
(45) Date of Patent: Aug. 22, 2023

(54) OPTICAL NETWORK, OPTICAL TRANSPORT SYSTEM, AND OPTICAL NODE INCLUDED THEREIN

(71) Applicant: Nippon Telegraph and Telephone Corporation, Tokyo (JP)

(72) Inventors: Ibrahim Salah, Musashino (JP); Toshikazu Hashimoto, Musashino (JP); Satoshi Shigematsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 272 days.

(21) Appl. No.: 17/268,755

(22) PCT Filed: Aug. 21, 2019

(86) PCT No.: PCT/JP2019/032591
§ 371 (c)(1),
(2) Date: Feb. 16, 2021

(87) PCT Pub. No.: WO2020/045179
PCT Pub. Date: Mar. 5, 2020

(65) Prior Publication Data
US 2021/0328676 A1   Oct. 21, 2021

(30) Foreign Application Priority Data

Aug. 31, 2018 (JP) .............................. JP2018-163592

(51) Int. Cl.
*H04B 10/275* (2013.01)
*H04L 12/42* (2006.01)
*H04Q 3/52* (2006.01)

(52) U.S. Cl.
CPC .......... *H04B 10/275* (2013.01); *H04L 12/42* (2013.01); *H04Q 3/526* (2013.01)

(58) Field of Classification Search
CPC ................................................... H04B 10/275
See application file for complete search history.

(56) References Cited

U.S. PATENT DOCUMENTS

2014/0294392 A1* 10/2014 Winzer ................... H04L 45/62
398/70

FOREIGN PATENT DOCUMENTS

| JP | 2001-257698 A | 9/2001 |
| JP | 2002-527990 A | 8/2002 |
| JP | 2004-104543 A | 4/2004 |

OTHER PUBLICATIONS

S. J. Ben Yoo, *Optical Packet and Burst Switching Technologies for the Future Photonic Internet*, Journal of Lightwave Technology, vol. 24, No. 12, 2006, pp. 4468-4492.

(Continued)

*Primary Examiner* — Shi K Li
(74) *Attorney, Agent, or Firm* — Workman Nydegger

(57) ABSTRACT

In optical transmission schemes of the related art, there is a problem of delay dependency on an overhead or a flow size. In a DC network and a supercomputer network, an OCS scheme and an OPS scheme remain in an examination stage. A network of the electrical packet switching is still a main stream. In a scheme of sharing links using a dedicated wavelength, a considerable number of wavelengths is also necessary to provide full connectivity. The number of wavelengths cannot be realized and an unrealistic number considering the usable number of wavelengths such as current used C bands. In an optical network and an optical transmission system of the present invention, burst mode data transmission in which a label-based switching on an exclusively reserved dedicated wavelength is used is performed. Each node has a uniquely allocated wavelength, and thus traffics coexisting in all the network nodes do not collide. By using an optical label processor, an overhead time for (Continued)

establishing links between nodes is unnecessary. Reuse of the same wavelength results in further decrease in the number of wavelengths.

14 Claims, 21 Drawing Sheets

(56) References Cited

OTHER PUBLICATIONS

Salah Ibrahim et al., *Burst-mode Optical Label Processor with Ultralow Power Consumption*, Optics Express, vol. 24, No. 7, 2016, pp. 6985-6995.

Ryo Takahashi et al., *Torus Data Center Network with Smart Flow Control Enabled by Hybrid Optoelectronic Routers [Invited]*, IEEE/OSA Journal of Optical Communication and Networking, vol. 7, Issue 12, 2015, pp. B141-B152.

Salah Ibrahim et al., *Contention-less Scheduling-free Torus Optical Network Comprising Thousands of Nodes*, 2018 European Conference on Optical Communication (ECOC), Sep. 27, 2018, 3 pages.

* cited by examiner

Fig. 11 (a) 1D TORUS
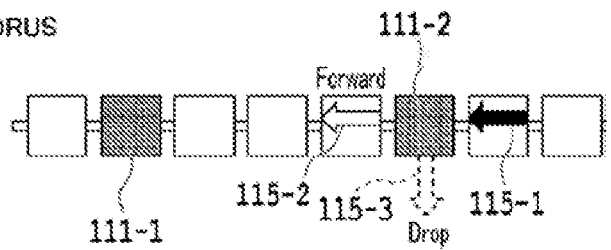
Fig. 11(b) 2D TORUS
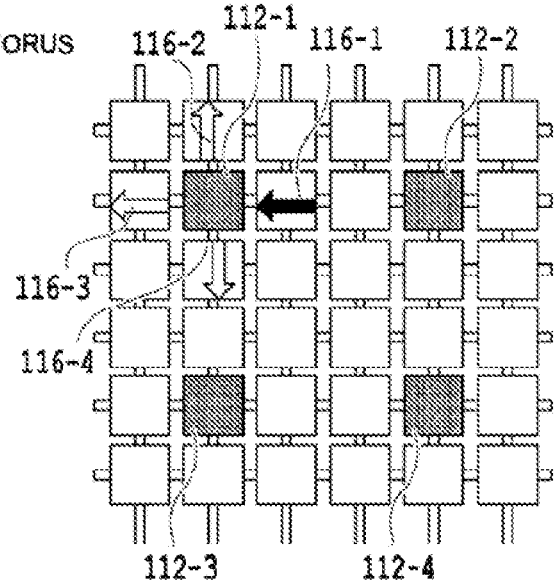
Fig. 11 (c) 3D TORUS
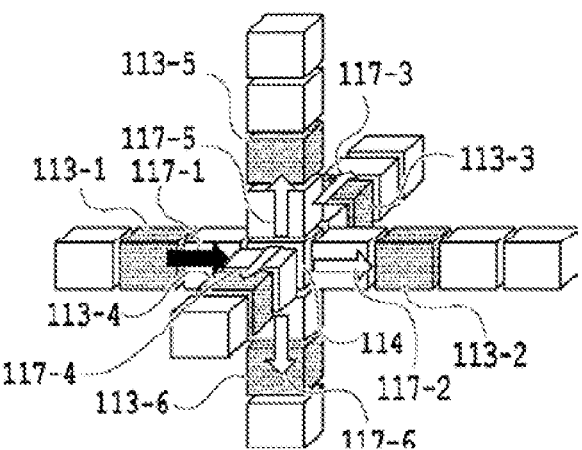

Fig. 21

| | 2D | 4D | 6D |
|---|---|---|---|
| DIMENSIONS OF NETWORKS (D) | | | |
| NUMBER OF NODES (N) | 64($8^2$) | 256($4^4$) | 1024 ($4^6$ AND OCCUPANCY RATIO 1/4) |
| NUMBER OF NODES PER DIMENSION (L) | L=8 | L=4 | L=4 |
| NUMBER OF WAVELENGTHS (W) 1 FIBER PER W=N/2D PORT | 64/4 = 16 | 256/8 = 32 | 8%~FULL C BAND |
| PAIR OF FIBERS PER W=N/4D PORT | 8 | 16 | 43 |
| NUMBER OF PORTS OF SWITCH (2D) | 1 x 4 | 1 x 8 | 1 x 12 |
| MAXIMUM NUMBER OF HOPS $\left(\frac{L_{dim1}}{2}+\frac{L_{dim2}}{2}+\cdots\frac{L_{dimN}}{2}\right)$ | 4 + 4 = 8 | 2 x 4 = 8 | 2 x 6 = 12 |
| NUMBER OF SIMULTANEOUS FLOWS FROM SAME NODE TO PERPENDICULAR ROUTES (2D) | 4 | 8 | 12 |

OPTICAL NETWORK, OPTICAL TRANSPORT SYSTEM, AND OPTICAL NODE INCLUDED THEREIN

BACKGROUND ART

The present invention relates to an optical network, an optical node used therein, and an optical transmission scheme for a data flow using light.

Data centers that store and process an explosive increase of data traffic are becoming more and more important. A data center is a generic name specifically for facilities in which computers (main frames, minicomputers, servers, and the like), data communication devices, and the like are installed and operated. In data centers, data center services are supplied to mainly monitor, operate, and manage information systems of companies, for example. Data centers substantially support information communication technology and systems to support trends such as virtualization technologies, cloud services, and big data.

Optical switching is a technology for providing a solid foundation to realize dynamic operations in a network of a data center (DC) or a supercomputer. However, to overcome restrictions on optical hardware hindering the achievement of goals, it is necessary to re-examine the operation principles of networks.

In a cutting-edge DC or supercomputer, a large number of computers, for example, servers or data storage devices, are connected to each other and supply various kinds of services. In general, a group of servers or storage devices are collected together and clustered in nodes. Optical networks are used to connect all the nodes. Compared to data optical transmission networks of the related art such as core networks or metro networks, DC networks and supercomputer networks have several special features such as more network nodes. High-speed full connectivity is another important factor in DC networks and supercomputer networks. That is, continuous seamless communication between nodes has to be performed without much time to prepare for connection between the nodes being taken.

Present DC networks and supercomputer networks operate based on electrical packet switching. Data packets are transmitted as optical signals through optical fibers connecting network nodes to each other. In each node, the packets are electrically switched and directed to desired destination nodes. In the processing of the electrical switching, transmitted optical packets are converted into electric signals and subsequently returned to formats of optical signals again, and thus the transmission resumes at an output point of a switching node.

In this way, optical-electrical-optical (OEO) switching is performed on transmitted packets in a broad scope. Such an approach has become widespread, but this CEO switching has become the main cause of problems in many networks such as high power consumption, a large traffic delay, and low flexibility. By removing CEO switching from the optical switching, it would be possible to remove the foregoing problems fundamentally.

However, there are several restrictions on corresponding devices due to the differences in physical properties between optical and electrical signals. For example, reliable all-optical memories have not yet been realized and high-speed optical switches in which reconfiguration is possible at a speed of a nanosecond order have been realized with only a limited number of ports. To use the advantages of present optical switching while overcoming the drawbacks of the present optical technology, operation principles of optical networks have to be re-examined.

FIG. 1 is a diagram illustrating a configuration of a hierarchical DC network of a technology of the related art which is based on electrical switching. Referring to FIG. 1, a well-known scenario in which a large traffic delay occurs due to frequent packet collision in a DC network 1 will be described. In the DC network 1, for example, switches 2, 4a to 4e, and the like are hierarchically deployed and a plurality of servers connected using Top Of Rack (ToR) switches in the lowermost layer. Here, a certain job can be assumed to be given to a server M(6). As a part of the execution of the job, the server M(6) transmits a request for data sharing or computing to other servers. When the servers which have received the request return results to the server M(6) within a certain short period of time, the packets can easily collide with each other. Accordingly, it is necessary to perform load balancing to reduce the collision. However, load balancing has little advantage in a sophisticated method that is executed in a higher network protocol, for example, Layer-3 switching. This is because sufficient processing resources and high power consumption are necessary for load balancing through Layer-3 switching even when packet collision cannot be completely avoided.

Here, a data flow A returned from a server A(5) under the switch 4d to the server M6 under the switch 4e will be considered. A data flow A(7) in the server A(5) has a size longer than a standard packet. That is, the data flow is segmented into a plurality of packets 1 to 10 which are transmitted separately. On route to the server M(6), these packets may travel along different routes 3a and 3b and encounter different collision probabilities during this time. The server M(6) receives packets included in a flow S(8) which are out of order within an expanded time ($T_{Act}$). Compared to an original length T of the data flow A(7), a time $T_{Act}$ necessary to complete a transmission transaction can be adopted as a figure of merit (FOM) for evaluating the network performance.

The FOM can be defined as a dimensionless index indicating the network performance as in the following formula.

Formula 1

$$FOM = \frac{\text{TIME UNTIL RECEPTION OF DATA IS COMPLETED}}{\text{LENGTH OF DATA FLOW}} \qquad \text{FORMULA (1)}$$

To resolve the problem in the scenario of FIG. 1, a new network concept of an ideal super dynamic network that has the FOM of 1 been proposed. The same network concept can also be used to resolve a strong task-dependent problem that depends on a communication network topology of a supercomputer. As will be described below, the new network can be realized as a network that has a virtual topology in which high-speed reconfiguration is possible.

Motivated by the advantage obtained by removing the repeated CEO switching in a network, various efforts have been made to realize a photonic DC network based on optical switching. As various modification examples of several proposed network, such a transmission mechanism is broadly classified into two categories. One category is a scheme for optical circuit switching (OCS) and the other category is a scheme for optical packet switching (OPS). In the OCS scheme, optical links are first set before transmission between any two network nodes starts according to a centralized approach of network control. Irrespective of a communication network topology, the set optical links include a plurality of intermediate nodes between a source node and a destination node. Along given spatial links, the source node transmits data to the destination node by using an allocated wavelength. All the switches located between the intermediate nodes transmit the received data to the destination node by using the preset wavelength.

A setting time in which the above-described spatial links are set is classified into three times. The first time is a time taken to switch signals between a related network node and a central network controller (signaling). The second time is a time taken to determine an optical route by allowing the central network controller to perform related calculation. The third time is a time taken to reconfigure optical switches located along a selected route (link). Even when considerable improvement can be achieved so that a reconfiguration speed of the optical switch is advanced, other times may determine a basic limit to realization of the high-speed OCS link. For example, when the central network controller is located at a location 1 km away from a certain node, a signaling time in which a signal is switched between the node and the central network controller is about 10 psec. When a time of one ethernet packet at 100 Gbps is considered to be about 120 nsec, the above-described signaling time in the OCS scheme can be understood to be longer by 2 digits than a single optical packet time.

On the other hand, the OPS scheme conforms to the decentralized approach in a network. That is, an optical label is given to each optical packet and each node recognizes this label and transmits a packet to the destination node. In the OPS scheme, the setting time as in the case of the OCS is not necessary, but a possibility of packets colliding with a certain probability is unavoidable.

FIG. 2 is a graph illustrating a time difference denoted by $\Delta T$ between a total time of transmission transaction and a data flow time in each optical transmission scheme. The horizontal axis represents a data flow time normalized with a packet length and the vertical time represents a time difference $\Delta T$ obtained by normalizing a difference between the total time $T_{Act}$ of transmission transaction and a data flow length T with a packet length in FIG. 1. The time difference $\Delta T$ is assumed to be 20 packets for an initialization time in the case of the OCS scheme and is indicated by a straight line 23. In the case of the OPS scheme, two different average packet collision probability are assumed and indicated by straight lines 24 and 25.

In the case of the OCS scheme, the initialization time equivalent to 20 packets is an overhead time 21 that has a direct influence on a value of the FOM defined as described above. As apparent from the straight line 23, in the OCS scheme, the time difference $\Delta T$ is constant and invariable irrespective of the data flow length T (shown on the horizontal axis). The fact that OCS schemes are optimal for sufficiently long data flows is also reflected in changes in an FOM value that changes over data time. In the OCS scheme, the FOM value is very bad in a short data flow of several packets. However, the longer data flow becomes, an effect of the overhead 21 decreases and the FOM value starts to approach 1 that is an ideal value.

Mapping to the FOM value from the time difference $\Delta T$ in the case of the OPS scheme includes a nonlinear relationship. This is because when packets collide, a waiting time occurs as an irregular time based on a network state and time intervals occurring between continuously occurring packet collision events. The points to note herein are that, as apparent is from FIG. 2, the straight lines 24 and 25 rise to the upper right in any of cases of different average collision probabilities (4% and 8%) and the time difference $\Delta T$ increases when the data flow becomes longer. That is, the FOM value becomes worse as the data flow becomes longer. Accordingly, in a new optical transmission scheme, there is a strong request that there is no overhead shown in the straight line 23 in the OCS scheme and there is no dependency on the flow sizes shown in the straight lines 24 and 25 in the OPS scheme. According to the new optical transmission scheme, a state of FOM=1 can be realized and a state of the time difference $\Delta T$ shown in the straight line 26 in FIG. 2 can be realized.

Because of the above-described problems, in a DC network and a supercomputer network, both the OCS scheme and the OPS scheme remain in an examination stage. At present, the network of the electrical packet switching illustrated in FIG. 1 is still a main-stream.

CITATION LIST

Non Patent Literature

[NPL 1] S. J. B. Yoo, "Optical Packet and Burst Switching Technologies for the Future Photonic Internet", December 2006, Journal of Lightwave Technology, vol. 24, no. 12, pp. 4468-4492

[NPL 2] Salah Ibrahim, Tatsushi Nakahara, Hiroshi Ishikawa, and Ryo Takahashi, "Burst-mode optical label processor with ultralow power consumption", 2016, Opt. Express 24, 6985-6995

SUMMARY OF THE INVENTION

Technical Problem

From the more general viewpoint, an optical network that satisfies requests for high-speed connection and more nodes can be realized in accordance with (a) common use of network resources and (b) exclusive reservation of network resources. However, in any of the two approaches, there are still tradeoffs and drawbacks as will be described below.

FIG. 3 is a set of diagrams illustrating two configuration examples for a common resource problem of an optical network. In FIG. 3(a), a network realized by unscheduled common use of network resources (links) is simply illustrated. The OPS scheme is a typical example of this network. In the case of FIG. 3(a), different network nodes simultaneously share the same spatial link in the network without any time adjustment being performing in advance. In this case, as described above, although a packet collision 31 can be reduced in accordance with a certain method, the collision is completely unavoidable.

In FIG. 3(b), a network realized based on scheduled common use of network resources is simply illustrated. As disclosed in NPL 1, an optical burst switching (OBS) scheme is a typical example of this network. In this case, different network nodes, for example, nodes 32 and 33, share the same spatial link in the network and each transmit optical bursts in accordance with a scheduled method at timings $T_1$ and $T_2$. In an optical network of the OBS scheme, an optical burst receiver that can receive an optical burst, perform label processing, and transmit the processed optical burst to a subsequent node is necessary for an optical switch (for example, an optical packet router) of each node. The optical burst receiver has a clock data reproduction function of a burst mode in which a clock is extracted from an optical data flow, for example, optical packets, input abruptly in a non-signal state. Accordingly, the optical burst receiver has capability to read label information without using a preamble, perform label processing, and perform necessary switching.

In a certain node capable of transmitting an optical burst on a shared spatial link, the node has to transmit a request to clear a link and check the usability of the link. Well-known implementation in the OBS scheme is Tell-And-Go (TAG) and Tell-And-Wait (TAW) technologies. In both the technologies, a transmission source node first has to transmit a request for using a spatial link to other nodes (Tell). Thereafter, before the node starts to transmit an optical burst, the source node has to wait until the link is cleared or a check for usability is received from other nodes. In this way, in the case of the scheduled common use of the resources, an overhead time is necessary. The overhead time becomes stricter with an increase in the number of network nodes.

FIG. 4 is a diagram illustrating a full mesh network which is a configuration example of another optical network. A full mesh network is a network in which each node is connected to the other nodes and it is possible to overcome the problems of an optical network in the schemes of the related art, as illustrated in FIG. 2. By using a wavelength region, a permanent link in which a dedicated wavelength is reserved enables collision of data flows to be avoided and enables necessity of a setting time which is an overhead to be removed. However, since network resources are not shared in a full mesh network, excessive resources are requested to realize above, therefore, a full mesh network has not been implemented practically. In this case, a bottleneck results in inefficiency of use of the network resources as well. When the number of nodes is N=1000, the number of connection links between the nodes is $N^2=10^6$ and the number of transceivers is $N^2=10^6$.

FIG. 5 is a diagram illustrating another network configuration sharing links using a dedicated wavelength. As illustrated in FIG. 5, to provide full connectivity in a simple network 50 formed by N nodes 35 and optical switches 51, permanent dedicated reservation of wavelength resources is used. In this case, each network node (source node) of a transmission source can allocate different wavelengths 52 to designate respective destination nodes. In the present configuration, the total number of wavelengths necessary for the entire network 50 is proportional to $N^2$. In a DC network or a supercomputer network, the number of wavelengths of $10^6$ is necessary for the number of actually located nodes $10^3=1000$ which is considerably numerous. This is an impractical number because the number of wavelengths cannot be substantially realized and is an unrealistic number considering the usable number of wavelengths in optical communication such as currently used C bands.

The present invention has been devised in view of the foregoing problems and an object of the present invention is to propose a novel network configuration and a novel optical transmission system capable of handling problems of packet collision or delay of an optical network in the related art, considerably reducing network resources, and realizing low power consumption and flexibility. Further, the present invention also proposes a configuration of a network optical node.

Means for Solving the Problem

To achieve the objective, according to an embodiment of the present invention, in an optical transmission system that includes a plurality (N: an integer) of optical nodes, each of the plurality of optical nodes transmits a data flow to a destination node by using a corresponding reserved dedicated wavelength and performs transmission switching on a data flow coming from another optical node based on label information assigned to the data flow. The optical transmission system can also be rephrased as an optical network or an optical transmission scheme.

Preferably, the plurality of optical nodes have a K (a natural number)-dimensional torus topology. Each of the plurality of optical nodes may reuse the same wavelength for two different optical nodes within a ring including the optical node and each route to other optical nodes may be pre-defined so that duplication does not occur in the same direction for the two optical nodes. The same wavelength may be reused N/2K (an integer) times for all the plurality of optical nodes.

Each of the plurality of optical nodes may include 2K optical transmitters as source nodes to transmit the data flow to other optical nodes via the pre-defined routes.

According to another embodiment of the present invention, the plurality of optical nodes may be connected in parallel by P optical fiber sets in accordance with the K-dimensional torus topology. The plurality of optical nodes may include P groups. Each of the P groups may be formed by the optical nodes belonging to the same ring of each K-dimensional torus network. Between the P groups, the optical nodes of the other rings may be included without duplication in all the plurality of optical nodes. The optical nodes belonging to one group among the P groups may only transmit the data flows in one set among the P optical fiber sets. The optical nodes belonging to the remaining groups except for the one group may only receive the data flows via optical fibers of the remaining sets except for the one set. N/(2K·P) (an integer) wavelengths may be used for the plurality of optical nodes.

Each of the plurality of optical nodes may include an optical receiver that is able to decode the label information in immediate synchronization with an input of the data flow in a non-signal state.

More preferably, the optical receiver includes a plurality of label processors that process the label information to correspond to different wavelengths, an optical switch that drops the data flow coming from the other optical nodes to the optical node or transmits the data flow to the other optical nodes based on the label information, and a selection switch that guides the dropped data flow to a predetermined number of burst mode (BM) receivers.

When the BM receivers are completely occupied, the optical node may delay communication or transmits a switching request to other optical nodes by using another transmission scheme.

A plurality of dedicated wavelength sets may be grouped together and a single label may be assigned to a data flow for which the plurality of dedicated wavelength sets are used.

Other optical transmission schemes including at least one of optical circuit switching (OCS), optical packet switching (OPS), and optical burst switching (OBS) may be supported with wavelengths other than the reserved dedicated wavelengths.

According to yet another embodiment of the present invention, an optical node is used in an optical transmission system. The optical node includes: an optical transmitter configured to transmit a data flow to a destination node by using a reserved dedicated wavelength corresponding to the optical node; and an optical receiver configured to decode label information assigned to the data flow in immediate synchronization with a data flow coming from another optical node in a non-signal state and perform transmission switching based on the label information.

Preferably, the optical node is one of a plurality of optical nodes included in the optical transmission system and a plurality of the optical nodes have a K (a natural number)-dimensional torus topology. Each of the plurality of optical nodes may reuses the same wavelength for two different optical nodes within a ring including the optical node and each route to other optical nodes may be pre-defined so that duplication does not occur in the same direction for the two optical nodes. The same wavelength may be reused N/2K (an integer) times for all the plurality of optical nodes.

The optical receiver may further include a plurality of label processors that process the label information to correspond to different wavelengths, an optical switch that drops the data flow coming from the other optical nodes to the optical node or transmits the data flow to the other optical nodes based on the label information, and a selection switch that guides the dropped data flow to a predetermined number of burst mode (BM) receivers.

Effects of the Invention

As described above, in the optical network of the present invention, it is possible to resolve the problems of packet collision or delay, considerably reducing network resources, and realizing low power consumption and flexibility of the system.

BRIEF DESCRIPTION OF DRAWINGS

FIG. 11 is a set of diagrams illustrating reuse of the same wavelength in each dimensional torus network.

FIG. 21 is a table that shows items in different dimensions of torus networks for comparison.

DESCRIPTION OF EMBODIMENTS

In the related art, as one of methods of sharing network resources, burst mode (BM) transmission has been adopted. In an optical network according to the present invention, BM transmission is newly used to enable any destination to be designated (addressed) for a network node without occurrence of collision or an unnecessary time for preparing for common use of resources on a dedicated wavelength (A) exclusively reserved for a source node. Based on the BM transmission, a dynamic optical network which is not yet known is realized. In the optical network according to the present invention, non-collision transmission is performed using an optical data flow with any wavelength. In the optical network according to the present invention, all the processes between nodes can be completed with optical signals. Therefore, compared to a present DC network or supercomputer network based on electrical packet switching, little power is consumed at each stage.

For example, based on only the basic concepts (a first embodiment) of the present invention, it is difficult to directly realize a DC network including thousands of nodes because of limitation on the number of wavelengths in currently usable communication band. According to the present invention, however, the same wavelengths can be reused without collision. Thus, a configuration of a new optical network which can also be handled indirectly in a DC network or a supercomputer network in which the number of nodes is greater than 1000 is also proposed (second and third embodiments).

In the optical network according to the present invention, there is no limitation on types or forms of data transmitted from each node to other nodes and use purposes. That is, the optical network does not depend on the length of a unit of data or a data structure, content of data to be transmitted, and the like. Accordingly, the optical network can be used for any information transmission including packet transmission. Accordingly, in the following description, a term "data flow" is used for information of an optical signal which is a target transmitted by a node.

In the following description, the optical network according to the present invention has been described, but a term "optical network" can be rephrased as an optical transmission system or an optical transmission scheme. The present invention has an aspect as a method of transmitting a data flow in an optical network and also has an aspect of an optical node in the optical network. In the following description, even when the optical node is simply described as a "node" for simplicity, the node means an "optical node".

Figure 6:
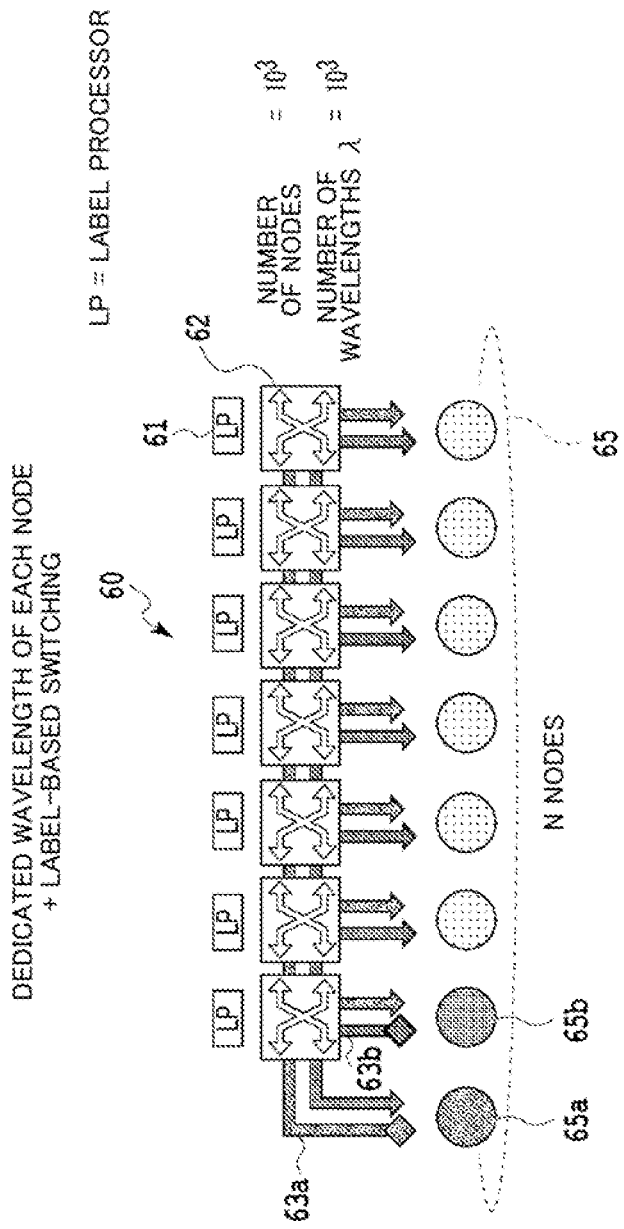
FIG. 6 is a diagram illustrating a basic configuration of an optical network according to a first embodiment of the present invention.

FIG. 6 is a diagram illustrating a configuration of an optical network according to a new approach of the present invention. An optical network 60 according to the present invention is formed by N nodes 65. The nodes 65 are connected by optical switches 62. A label processor 61 to be described below is associated with each optical switch. In the optical network 60, a wavelength corresponding to a source node is designated for a data flow in which any other node is set as a destination node from a transmission source (a source node). Accordingly, a corresponding dedicated wavelength can be allocated to each source node. By using a dedicated wavelength for each source node, it is possible to considerably reduce the number of wavelengths necessary in the optical network.

Figure 5:
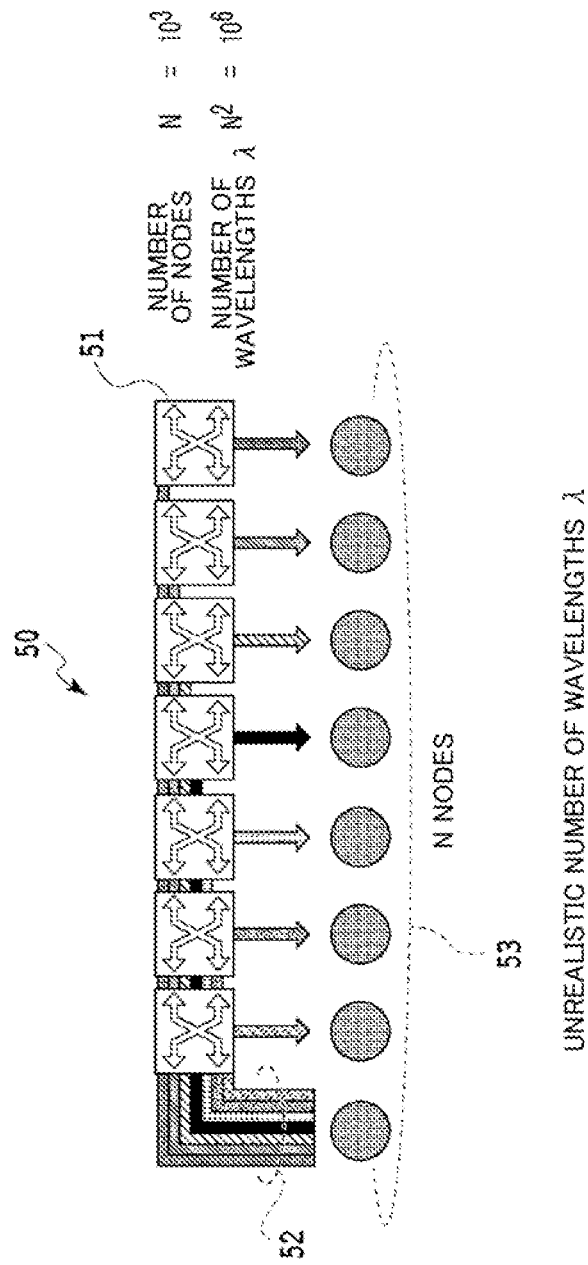
FIG. 5 is a diagram illustrating another network configuration sharing links using a dedicated wavelength.

Specifically, a first wavelength is allocated to a data flow propagating along a route 63a in which a node 65a in FIG. 6 is set as a source node and another node is set as a destination node. On the other hand, a second wavelength different from the first wavelength is allocated to a data flow propagating along a route 63b in which a node 65b is set as a source node and another node is set as a destination node. Accordingly, when the number of nodes of the optical network 60 is N, the number of necessary wavelengths A may be N. This considerably differs from a situation in which the number of wavelengths of $N^2$ is necessary in the optical network 50 in the related art illustrated in FIG. 5.

In the embodiment in which the basic concepts of the optical network according to the present invention illustrated in FIG. 6 is proposed, exclusive allocation of a single dedicated wavelength to one source node will be described as the simplest configuration. However, two or more dedicated wavelengths may be allocated to one source node as long as collision does not occur. In the second and third embodiments to be described below, the same wavelengths are repeatedly reused in one optical network. Accordingly, note that the same wavelengths can be used between different source nodes under the condition that a certain route is determined in advance.

Figure 1:
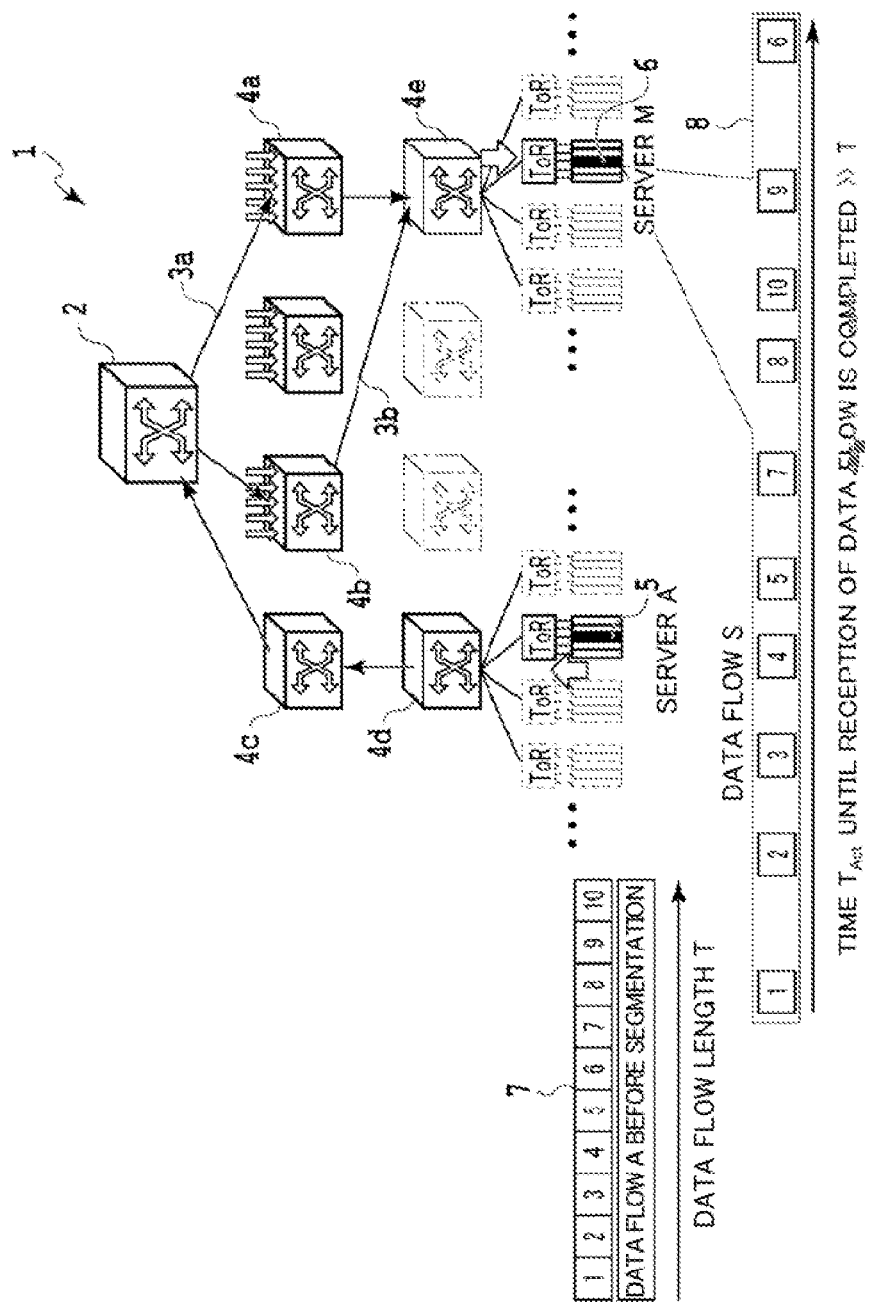
FIG. 1 is a diagram illustrating a configuration of a hierarchical DC network of the related art which is based on electrical switching.
Figure 2:
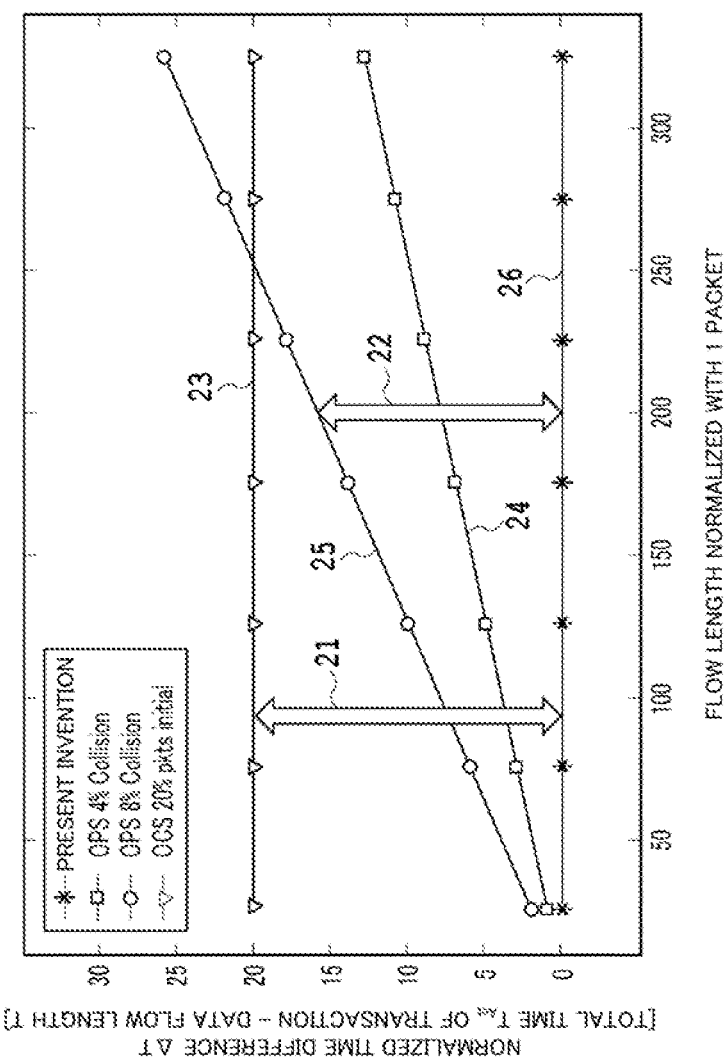
FIG. 2 is a graph illustrating a time difference between a total time of transmission transaction and a data flow time in each optical transmission scheme.
Figure 3:
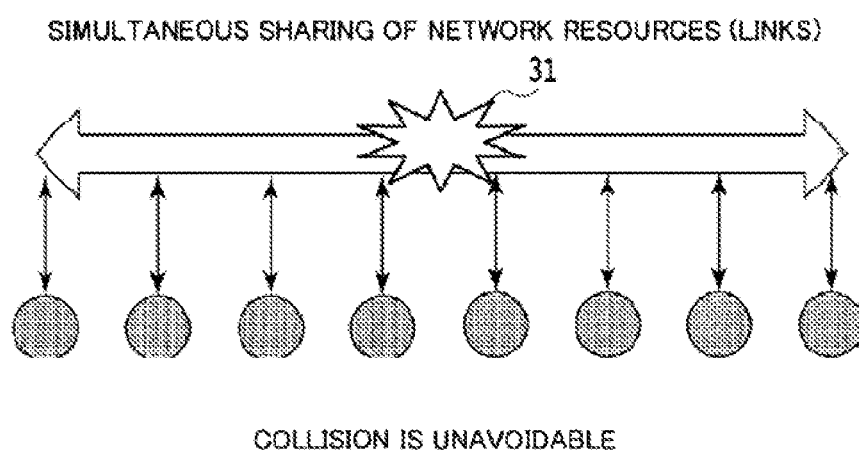
FIG. 3 is a set of diagrams illustrating two configuration examples for a common resource problem of an optical network.
Figure 3:
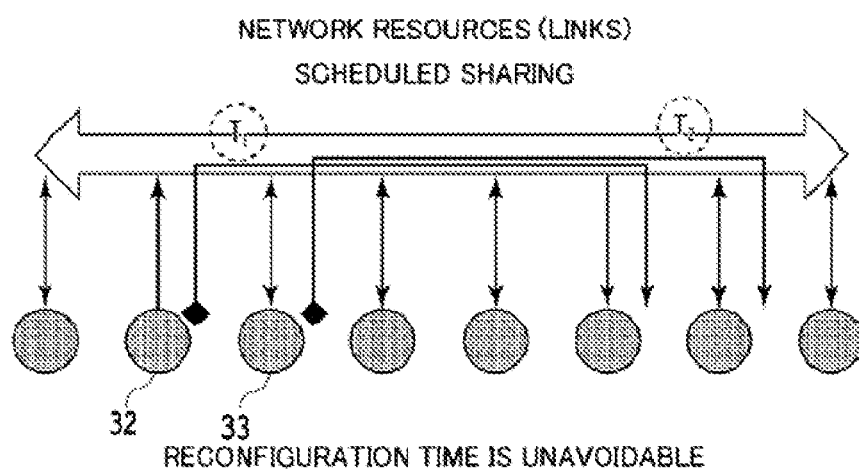
Figure 4:
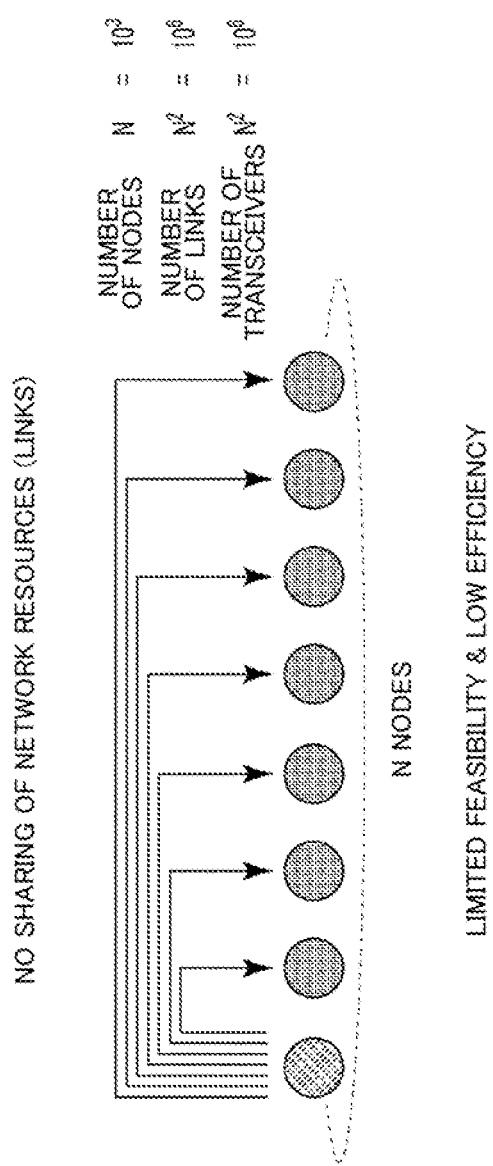
FIG. 4 is a diagram illustrating an example of a full mesh configuration of another optical network.

In the optical network according to the present invention, while an individual dedicated wavelength is used for each source node, as described above, a label defining each destination node is assigned to an optical data flow transmitted from a source node. In an intermediate node located on a route between a source node and a destination node, each data flow is transmitted to the destination node based on the label information. Processing of the data flow based on label information is performed by the label processor 61 in the optical switch associated with each node. The label processor has already been put into use in an optical burst receiver in a network based on BM transmission, as described in the OBS scheme with reference to FIG. 3(b). Even when a data flow is abruptly input to an optical burst receiver in a non-signal state, the optical burst receiver can synchronize with clock extraction immediately and can decode the label information in a header of a packet with no preamble substantially immediately. At present, as disclosed in NPL 2, for example, a burst-mode label processor with low delay can be used. The burst-mode label processor can pass a data flow directly via an intermediate network node in an optical domain without performing electrical switching. In the optical network 60 according to the present invention, the corresponding label processor 61 in the optical switch 62 associated with each node is included.

Accordingly, the present invention can be embodied, as described below. That is, in an optical transmission system including a plurality (N: integer) of optical nodes, each of the plurality of optical nodes transmits a data flow to a destination node by using a corresponding reserved dedicated wavelength and performs transmission switching on data flows coming from other optical nodes based on the label information assigned to the data flow.

As illustrated in FIG. 6, a new scheme for the optical network according to the present invention can be summarized as burst-mode data transmission in which label-based switching is used with an exclusively reserved dedicated wavelength. Each node in the optical network according to the present invention can have a uniquely allocated wavelength, and thus no collision can occur in traffic coexisting in all the network nodes. When an optical label processor is used, a setting time for establishing a link between nodes in advance, that is, an overhead time, is also unnecessary. According to the scheme of the new optical network in the present invention, it is possible to resolve the two major problems of an overhead and the delay which depends on the length of a data flow, in the optical transmission scheme of the related art. Further, a more important advantage is that it is possible to considerably reduce the number of wavelengths necessary for a system from $N^2$ to N.

First Embodiment

A configuration of an optical network according to the first embodiment in which the most basic concepts of the above-described present invention are used as it is will be described in more detail. A C band (1530 to 1565 nm) and an L band (1565 to 1625 nm) are wavelength bands which are most widely used at present to realize low propagation loss and optical signal transmission over optical fibers. Usable full-wavelength bands of the bands are segmented into smaller sub-band sets generally called "channels" in accordance with a fixed grid method. The number of network nodes which can be supported directly using the scheme of the optical network according to the present invention is limited by a total number of channels in the above-described C and L bands. For example, considering an example in which only the C band is used, the optical network based on the approach of the present invention can realize supporting a maximum of 80 network nodes. Further, by adding the L band, the number of channels can be expanded to about two times 80 (160) network nodes. In future, there is a possibility of more channels being usable with these bands.

Certainly, the role of a very large scalable DC network is central for providing various network services. On the other hand, decentralization and deployment of smaller, scalable DC networks in a metro-network are one trend. A motive for introducing a decentralized DC network is to realize a lower-delay service when end users are close to the DC network. The scheme of the new optical network according to the present invention of the first embodiment can be directly used to realize an idea of a decentralized relatively small scalable DC network.

A present metro-network is realized as a reconfigurable optical add/drop multiplexer (ROADM) network in which optical signals can be split and inserted into each node based on the OCS scheme. As described above, the new scheme of the optical network according to the present invention has the advantage of supporting more nodes using a smaller number of wavelengths. According to the scheme, by completely removing the setting times of links using the optical label processors, it is possible to flexibly reconfigure more various links in an optical network and realize a more dynamic network.

On the other hand, the number of nodes necessary to be supported inside a very large scalable DC network is of an order exceeding 1000. In the DC network including such a large number of nodes, it is difficult to apply the scheme of the optical network of the present invention described in the first embodiment without change. In a scenario to be described below, the same wavelength can be reused several times without occurrence of collision of a data flow. In the following embodiments, a configuration and an operation of an optical network also applicable to a large scalable DC network that has the number of nodes exceeding 1000 will be described.

Considering the number of currently usable wavelengths (about 80) in the C band or the like, it is difficult to directly realize a network including thousands of nodes. However, a network can handle such a number of nodes by imposing a given condition in advance on a route obtained from a source node and reusing the same wavelength without occurrence of collision. Therefore, two basic ideas are introduced as fundamentals of use of a torus network topology. A given wavelength A is allocated to each node in a torus topology and a data flow is transmitted along only a strictly pre-defined route set and in a direction from the node. A label assigned to each data flow is used to transmit the data flow to a destination node. A pre-defined route is designated to each node so that each wavelength A can be reused without occurrence of collision of any flow.

Second Embodiment

As the first embodiment is described above, as illustrated in FIG. 6, the following features are based on the scheme of the optical network according to the present invention. Here, the features are that label-based switching is used on a dedicated wavelength channel associated for each source node. In the configuration of the optical network according to the embodiment, a first idea that the same wavelength can be reused without occurrence of collision in a network is introduced. To design an optical route in which the same wavelength is used to avoid collision of a data flow is a basis of this idea.

Figure 7:
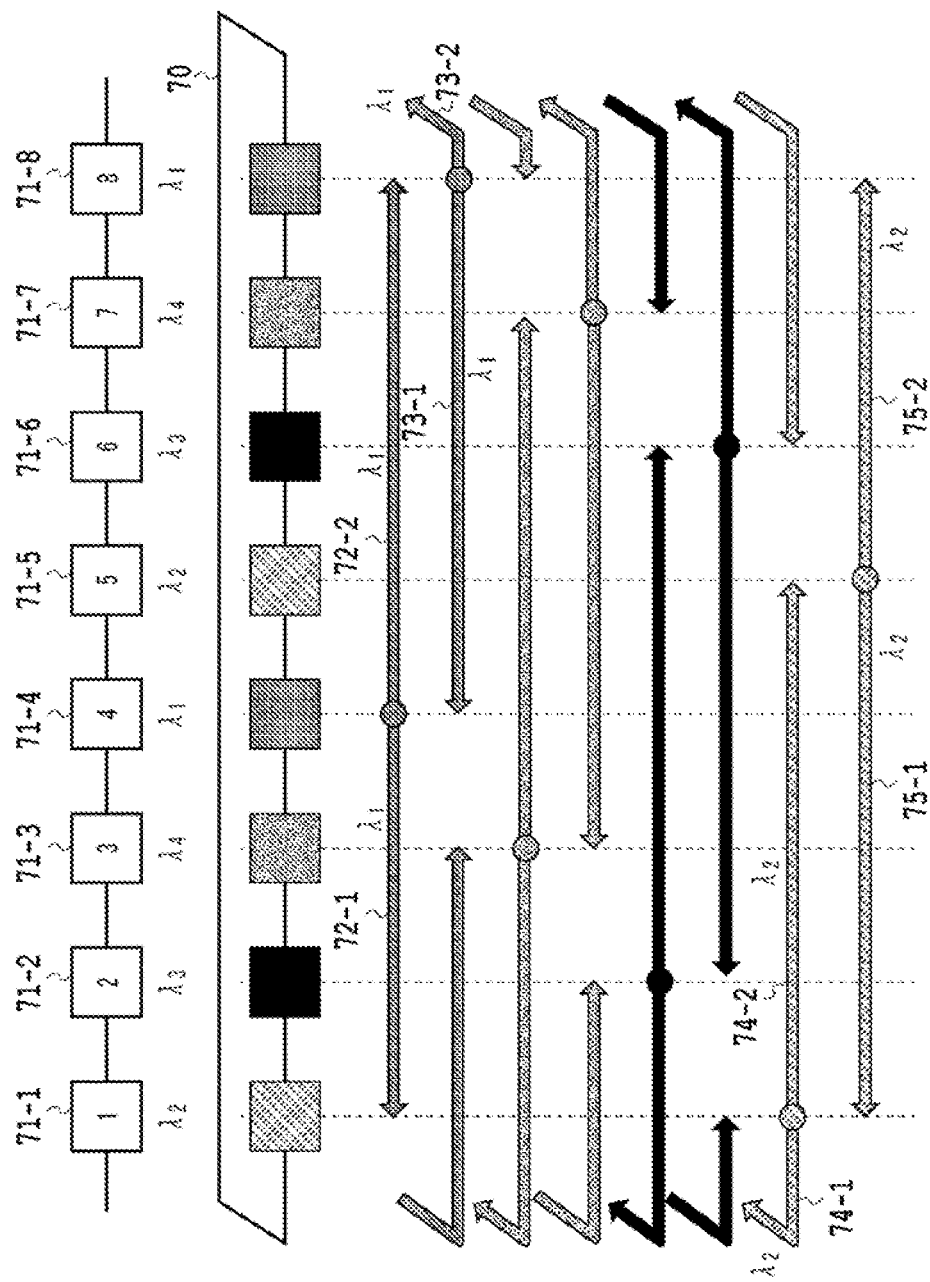
FIG. 7 is a diagram illustrating a basic configuration of an optical network according to a second embodiment of the present invention.

FIG. 7 is a diagram illustrating a basic configuration of an optical network according to a second embodiment of the present invention. In FIG. 7, an approach in a ring network 70 with the simplest configuration, that is, an optical network with a 1-dimensional torus topology configuration, will be described. The ring network 70 has a configuration in which eight nodes from nodes 1 (71-1) to 8 (71-8) are connected in sequence in a ring form. Dedicated wavelengths of λ2, λ3, λ4, λ1, λ2, λ3, λ4, and λ1 are allocated to the nodes in the order from the nodes 1 to 8. In the optical network according to the first embodiment, different dedicated wavelengths corresponding to the source nodes can be allocated. Since the source nodes and the allocated wavelengths have a one-to-one relationship, a possible number of nodes is limited to a maximum number of usable wavelengths. On the other hand, in an optical network according to the second embodiment, as illustrated in FIG. 7, the same wavelength is repeatedly used twice in the ring network 70.

Specifically, to transmit a data flow, one wavelength is allocated to each node in the ring network along only two designated routes in a direction indicated by an arrowhead (tip) of an arrow. For example, when the node 4 (71-4) is focused on, the wavelength λ1 is used by the node 4 and a data flow is transmitted along two routes 72-1 and 72-2. For simplicity, the right direction of FIG. 7 is defined as an east direction and the left direction is defined as west direction.

At this time, for example, the data flow from the node 4 can reach the node 7 along only the route in the east direction and reach the node 1 along only the route in the west direction. This means that the same wavelength λ1 can be reused by one node 8 (71-8). This is because each data flow transmitted by two nodes of the nodes 1 and 8 normally propagates in mutually opposite directions in one ring network 70 with the torus topology.

In FIG. 7, note that along the route 72-2 in the east direction from the node 4, the node 8 is an end and thus the data flow does not propagate in the ring beyond the node 8. Similarly, along the route 72-1 in the west direction from the node 4, the node 1 is an end and the data flow does not further propagate in the ring beyond the node 1. Note that the two data flows transmitted over optical fibers of an optical network do not mutually interfere with each other and can independently exist, as long as propagation directions of the data flows are mutually opposite to each other, although the data flows are optical signals with the same wavelength. This can also be understood from a circuit configuration of an optical switching unit of an optical node to be described below with reference to FIG. 10.

Similarly, one wavelength λ2 is allocated to each of the node 1 (71-1) and the node 5 (71-5) along only two routes distinguished by propagation directions of data flows. Each data flow along two routes 74-1 and 74-2 from the node 1 and each data flow along two routes 75-1 and 75-2 from the node 5 propagate in mutually opposite directions from the viewpoint of each node. Accordingly, the network can distinguish two data flows propagating in opposite directions in each node and perform drop or transmission switching processing. In this way, the same wavelength can be reused twice by distinguishing the data flows with the same wavelength from each other by propagation directions in one ring network. Accordingly, according to the first idea, the same wavelength can be reused by setting the pre-determined routes in the torus network.

In the ring network of FIG. 7, the positions of two nodes using the same wavelength are preferably set to positions at which the number of hops in the ring is as small as possible. This is because the quality of optical signals deteriorates as many as the number of hops when a data flow is transmitted from a source node to a destination node. Accordingly, two nodes using the same wavelength may be selected so that the two nodes are located at the most distant positions in the ring (positions at which the number of hops is the minimum). In this way, the route defined in two nodes is also a shortest route with the minimum number of hops.

Each node can transmit a data flow that has any length. Each data flow has a header, that is, a label for identifying an address. As described in the first embodiment, link setting is unnecessary and any node can also transmit data flows in sequence without interaction with a central network controller. In any network node, a data flow arriving at the same port is distinguished based on a wavelength and a label of a flow header. The data flow is dropped to the node or is transmitted to a subsequent node along a previously designated pass.

Figure 8:
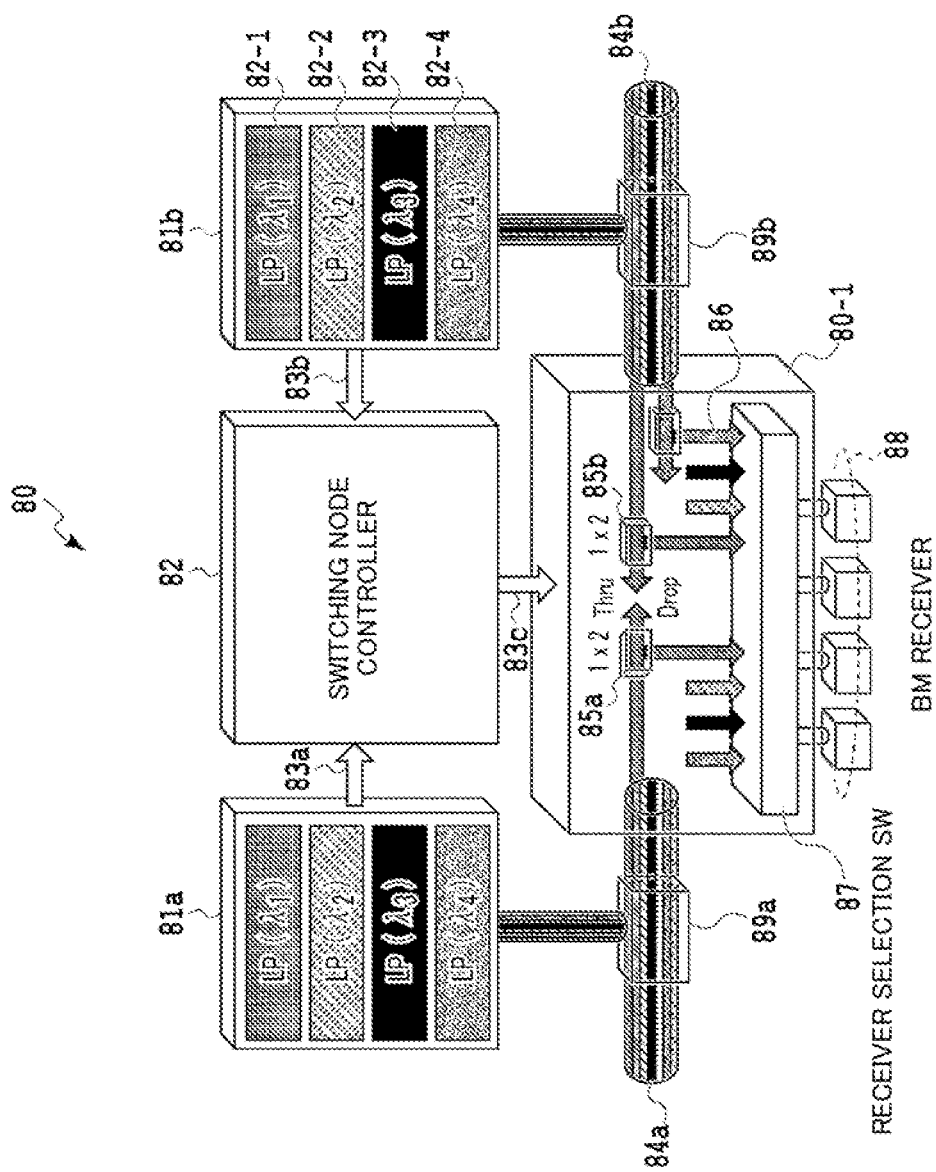
FIG. 8 is a diagram illustrating a basic configuration of an optical network according to the second embodiment of the present invention.

FIG. 8 is a diagram illustrating an overview of a configuration of an optical node in the optical network according to the present invention. An optical node in FIG. 8 corresponds to one of the nodes 1 to 8 in the 1-dimensional torus network in FIG. 7. In input ports 84*a* and 84*b* of the node 80, some of the incoming optical signals are tapped (branched) by optical branches 89*a* and 89*b* to head for label processor (LP) sets 81*a* and 81*b*. The LPs in the LP sets handle different wavelengths of λ1 to λ4 and controls 1×2 optical switches to drop and forward the incoming data flow. For example, a label of an optical signal from the input port 84*b* on the right side of the optical node 80 in FIG. 8 is read by LPs 82-1 to 82-4 for each wavelength and label information 83*b* is supplied to a switching controller 82. The switching controller 82 controls 1×2 optical switches 85*a* and 85*b* or the like of an optical switch unit 80-1 in accordance with control information 83*c* in conjunction with label information 83*a* from an input port 84*a* on the left side. For example, the optical switch 85*a* performs switching to drop (Drop) a data flow with the wavelength λ1 coming from the source node and guide the data flow to a receiver selection SW87 or to transmit (Thru) the data flow toward the input port 84*b* on the opposite side. A data flow with the wavelength λ4 from another source node is input as a data flow 86 dropped by another optical switch to the receiver selection SW87.

Accordingly, the optical node in FIG. 8 includes an optical receiver to be described below. The optical receiver decodes label information assigned to a data flow in immediate synchronization with a data flow coming from another optical node from a non-signal state and performs transmission switching based on the label information. It is necessary for switching speeds of the 1×2 optical switches 85*a* and 85*b* to match a shortest data flow and a guard time between flows. When the switches have a speed of nanosecond order, switching (Add/Drop) of the same short data flow as a packet of the related art is enabled. Although not clarified in FIG. 8, note that the optical node 80 is not only the BM receiver illustrated in FIG. 8 and, of course, includes an optical transmitter that adds a data flow and transmits the data flow to another node as a source node. That is, the optical node in FIG. 8 also includes an optical transmitter that transmits the data flow to a destination node by using a reserved dedicated wavelength corresponding to the optical node.

Although different from a general case, the number of wavelengths which are supported on the assumption that all the nodes have a high-speed flow transmission capability is half the number of nodes of the 1-dimensional torus network. For example, in the configuration of the optical node 80 in FIG. 8, four wavelengths (λ1 to λ4) are necessary for the eight nodes, the nodes 1 to 8, of the 1-dimensional torus network illustrated in FIG. 7.

In the destination node, a data flow is received by a burst mode receiver (BM-Rx). In a network including a large number of nodes, it is difficult to assign a different receiver for each wavelength in each input port of each node. Instead, each node includes a plurality of BM receivers 88 of which operations do not depend on a wavelength. Each node selects one of the BM receivers using the receiver selection SW87 to share the BM receiver in accordance with the dropped data flow. A minimum number of a plurality of BM receivers 88 in a given node is set in accordance with the maximum number of data flows assumed to be simultaneously received in the node. Before all the receivers usable in the node reach a limit use state, such a situation is, of course, announced to other nodes. In this case, it is necessary to make a request for temporarily delaying or using another usable transmission scheme.

Figure 9:
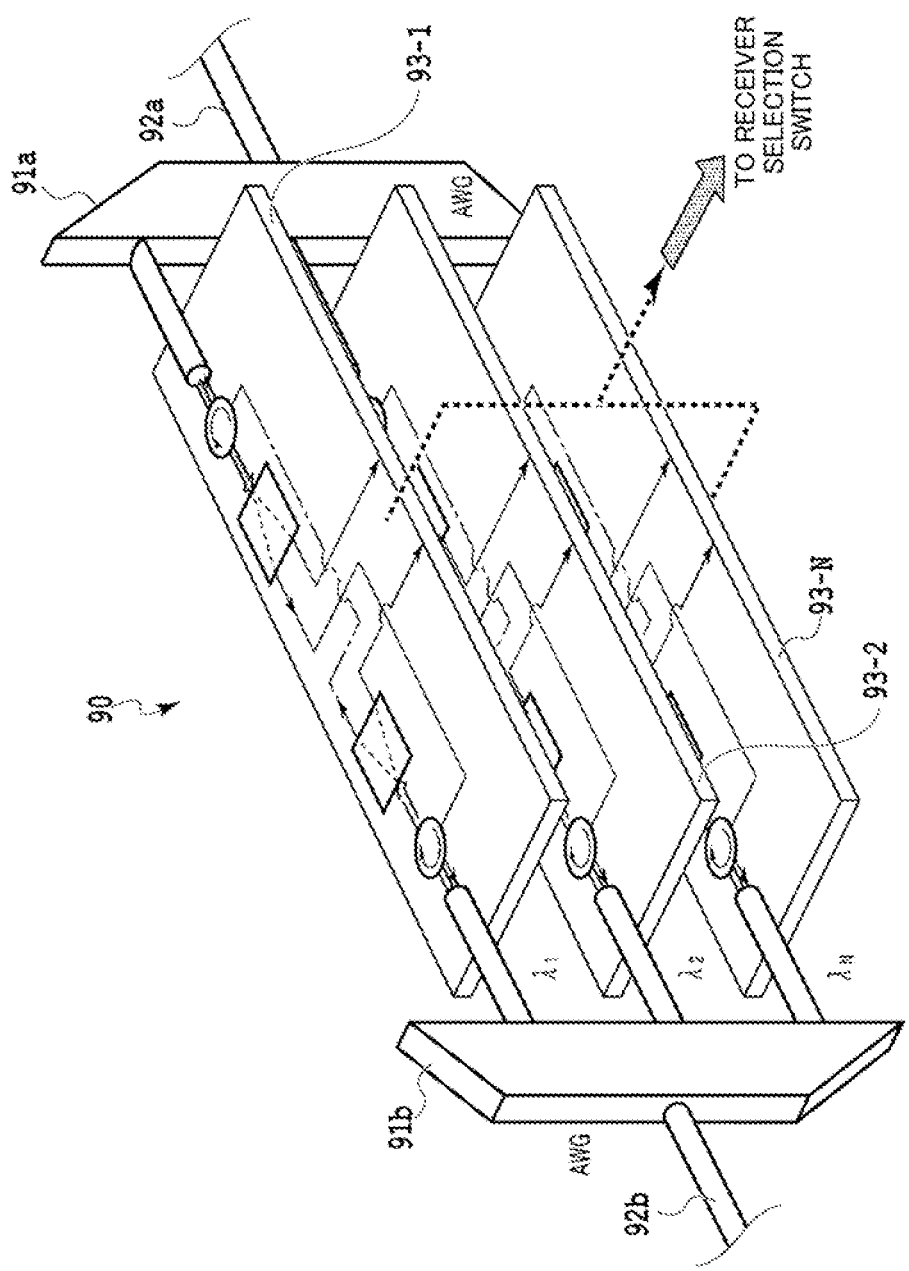
FIG. 9 is a diagram illustrating a configuration of an optical switch unit of a node of an optical network according to the present invention.

FIG. 9 is a diagram illustrating a more specific configuration of an optical switch unit in a node of an optical network according to the second embodiment. An optical switch unit 90 in FIG. 9 substantially corresponds to the optical switch unit 80-1 and the two input ports 84*a* and 84*b* in FIG. 8. In the optical switch unit 90, two optical fibers 92*a* and 92*b* are connected as input ports corresponding to two routes in the different propagation directions in FIG. 7. Optical signals with multiplexed wavelengths are guided to optical switch circuits 93-1, 93-2, . . . , and 93-N different for each wavelength by AWG 91*a* and 91*b*. Further, the optical signals are dropped and guided to receiver selection switches (not illustrated in FIG. 9) or are transmitted directly to opposite optical fibers (Thru) in accordance with label information.

Figure 10:
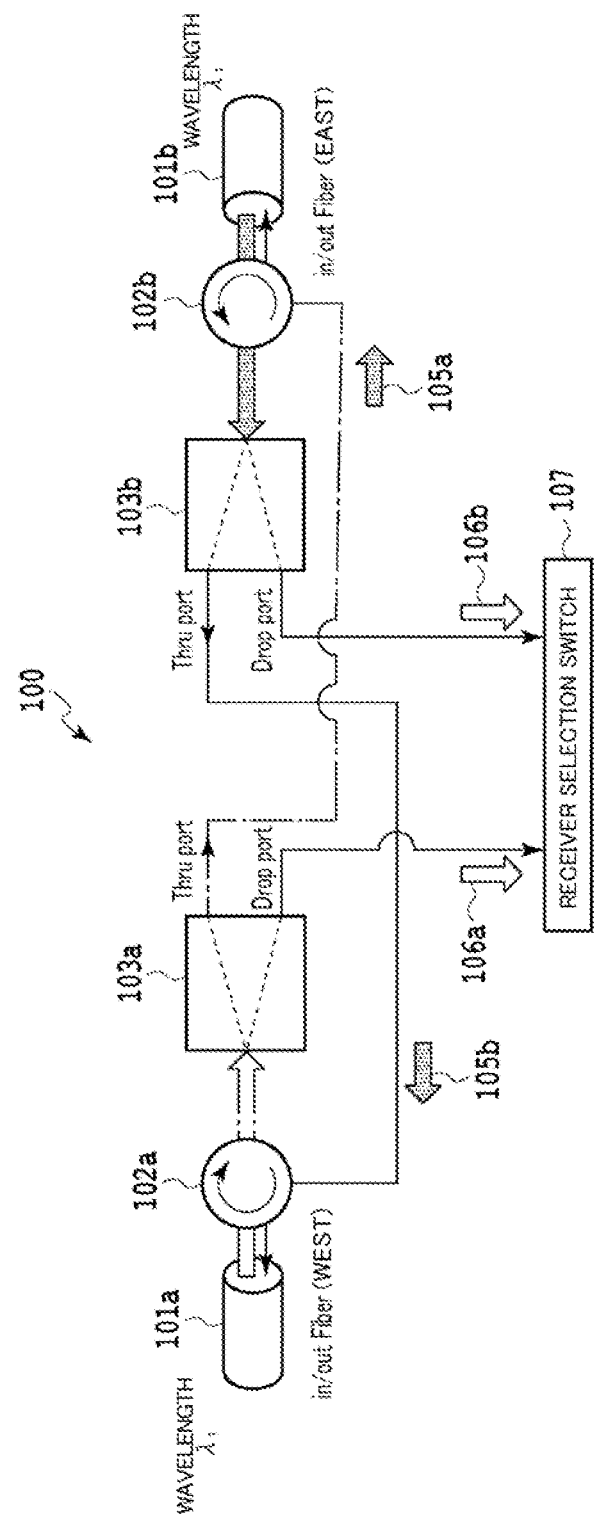
FIG. 10 is a diagram illustrating a configuration of an optical switch circuit substrate of a node according to the present invention.

FIG. 10 is a diagram illustrating a more specific configuration of an optical switch circuit of the optical switch unit in a node of the optical network according to the second embodiment. The configuration in FIG. 10 corresponds to one of the optical switch circuits 93-1, 93-2, . . . , and 93-N in FIG. 9. In one optical switch circuit 100, two optical fibers 101*a* and 101*b* are connected as input ports corresponding to two routes with the wavelength λ1 in different propagation directions in the node 4 (71-4) in FIG. 7. For example, the optical fiber 101*b* connected to the route 72-2 in the east direction of FIG. 7 is connected to the 1×2 optical switch 103*b* via an optical isolator 102*b*. The 1×2 optical switch 103*b* includes a Thru port and a Drop port. When the switching controller 82 selects the Thru port based on the label information, a data flow 105*b* with λ1 in the left direction (the west direction) coming from the optical fiber 101*b* is transmitted to be sent to the optical fiber 101*a*. On the other hand, when the Drop port is selected in the 1×2 optical switch 103*b*, a data flow 106*b* with λ1 is dropped to be sent to the receiver selection switch 107. Completely the same operation as the data flow of the above-described left direction (the west direction) is performed on the data flows 105*a* and 106*a* in the right direction (the east direction) coming from the optical fiber 101*a* connected to the route 72-1 in the west direction of FIG. 7.

As known from the specific node configuration of FIGS. 8 to 10, in the transmission scheme for the optical network according to the present invention, note that there are switching of two different levels necessary for each node. A first switching layer operates to drop or transmit the data flow coming based on an output result of the label processor. This switching is referred to as transmission switching (forwarding switching) in the following description. The switch unit 80-1 for the transmission switching normally includes 1×2N ports, for example, optical switches 103*a* and 103*b*. Here, N is a dimension of a torus in a communication network topology. In the configuration of the optical network in FIG. 7, N=1 is satisfied in a 1-dimensional torus network. Therefore, the optical switches 85*a* and 85*b* of the 1×2 ports are used as in FIG. 8.

On the other hand, a second switching layer is receiver selection switching and a pre-defined receiver is selected to process the dropped data flow in the node. The receiver selection switching is performed by the selector switches 88 and 107 and the number of ports is also determined in accordance with the number of usable burst mode receivers which can differ for each node. The optical network according to the second embodiment in FIG. 7 is shown in the example in which the same wavelength is reused in the simplest 1-dimensional torus network (N=1). By increasing the dimension of the torus network, it is possible to further reuse the same wavelength.

FIG. 11 is a set of diagrams illustrating reuse of the same wavelength in each dimensional torus network of N=1 to 3. As illustrated in FIGS. 11(*a*) to 11(*c*), to keep a collision-free state in the higher dimensional K torus network, the same wavelength A can be used twice in accordance with each dimension. At this time, the number of wavelengths necessary for a network that has N nodes is N/2K. For example, FIG. 11(*a*) illustrates reuse of the same wavelength in the 1-dimensional torus network described above in FIGS. 7 to 10. Eight nodes are in one ring and the same wavelength is used for, for example, two nodes 111-1 and 111-2. When the node 111-2 is focused on, a data flow 115-1 in the left direction becomes a dropped data flow 115-3 or becomes a directly transmitted data flow 115-2 in the node 111-2. Accordingly, in the node 111-2, the 1×2 optical switches are necessary.

FIG. 11(b) illustrates reuse of the same wavelength in a 2-dimensional torus network. In this network, note that two nodes at upper and lower ends among seven nodes arranged in one column in the vertical direction are connected to each other in a ring form to form a torus network. Similarly, two nodes at right and left ends among seven nodes arranged in the horizontal direction are connected to each other in a ring form to form a torus network. Accordingly, for example, when the node 112-1 is focused on, the network has a structure of a 2-dimensional torus network in the horizontal and vertical directions, that is, in two directions perpendicular topologically to each other. It is easy to understand that the reuse principle of the same wavelength described in the 1-dimensional torus network described in FIG. 7 can be independently applied to the two directions and expanded to the 2-dimensional torus network. That is, to keep the collision-free state in the 2-dimensional torus network, the optical network according to the second embodiment can use the same wavelength λ twice in each of the ring network with two dimensions. Accordingly, in the configuration of the optical network in FIG. 11(b), the same wavelength λ1 can be repeatedly reused a total of four times in the four nodes 112-1 to 112-4.

Here, a switching operation (transmission switching) of a data flow based on the label information in the node 112-1 will be considered. A data flow 116-1 in the left direction to the node 112-1 becomes a dropped data flow (not illustrated) or becomes one of data flows 116-2 to 116-4 directly transmitted along three other routes except for the incoming route in the node 112-1. Accordingly, in each node in the 2-dimensional torus network, an optical switch of 1×4 ports (1×2N ports: N=2) is necessary rather than an optical switch of 1×2 ports in FIG. 10. The optical switch unit of the optical node in the 2-dimensional torus network includes two sets of the optical switch unit 100 in FIG. 10 and has a configuration in which three Thru ports of the 1×4 port optical switch are connected to input ports of three nodes excluding the input port in the incoming route. In the 2-dimensional torus network, it is not necessary to include two receiver selections SW107 in FIG. 10 and one receiver selection SW can be organized.

FIG. 11(c) illustrates reuse of the same wavelength in a 3-dimensional torus network. In this network, note that only nodes located in three rings including one node 114 among the nodes arranged in 3-dimensionally are depicted for description. For convenience, three directions corresponding to three tori are referred to as the right and left directions, the upper and lower directions, and the front and back directions centering on the node 114. For example, note that eight nodes are included in routes of the ring in the right and left directions including nodes 113-1 and 113-2 and two nodes at right and left ends are connected in a ring form to form a torus network. Similarly, eight nodes are included in routes of the ring in the upper and lower directions including nodes 113-5 and 113-6 and two nodes at upper and lower ends are connected in a ring form to form a torus network. In addition, eight nodes are included in routes of the ring in the front and back directions including nodes 113-3 and 113-4 and two nodes at front and back ends are connected in a ring form to form a torus network.

Accordingly, when the node 114 is focused on, this network has a structure of a 3-dimensional torus network in three directions in the right and left directions, the upper and lower directions, and the front and back directions perpendicular topologically to each other. It is needless to say that the reuse principle of the same wavelength described in the 1-dimensional torus network described in FIG. 7 can be independently applied to the three directions and expanded to the 3-dimensional torus network. That is, to keep the collision-free state in the 3-dimensional torus network, the same wavelength λ can be used twice in three dimensions. Accordingly, in the configuration in FIG. 11(c), the same wavelength λ1 can be repeatedly reused a total of six times in the six nodes 113-1 to 113-6.

Here, a switching operation (transmission switching) of a data flow based on the label information in the node 114 will be considered. An incoming data flow 117-1 in the right direction to the node 114 becomes a dropped data flow (not illustrated) or becomes one of data flows 117-2 to 117-6 directly transmitted along five other routes except for the incoming route in the node 114. Accordingly, in each node in the 3-dimensional torus network, an optical switch of 1×6 ports (1×2N ports: N=3) is necessary rather than an optical switch of 1×2 ports in FIG. 10. The optical switch unit of the optical node in the 3-dimensional torus network includes three sets of the optical switch unit 100 in FIG. 10 and has a configuration in which five Thru ports of the 1×6 port optical switch are connected to the other five input ports of nodes excluding the input port in the incoming route. In the 3-dimensional torus network, it is not necessary to include three receiver selections SW in FIG. 10 are and one receiver selection SW can be organized.

As described above, the optical network (the optical transmission system) according to the embodiment can be embodied by satisfying the following requirements. Here, the requirements are that the plurality of optical nodes has a K (a natural number)-dimensional torus topology, each of the plurality of optical nodes reuses the same wavelength in two different optical nodes in the ring including the optical nodes, each route to the other optical nodes is pre-defined in the two optical nodes so that duplication does not occur in the same direction, and the same wavelength is reused N/2K (an integer) times in all the plurality of optical nodes.

Figure 12:
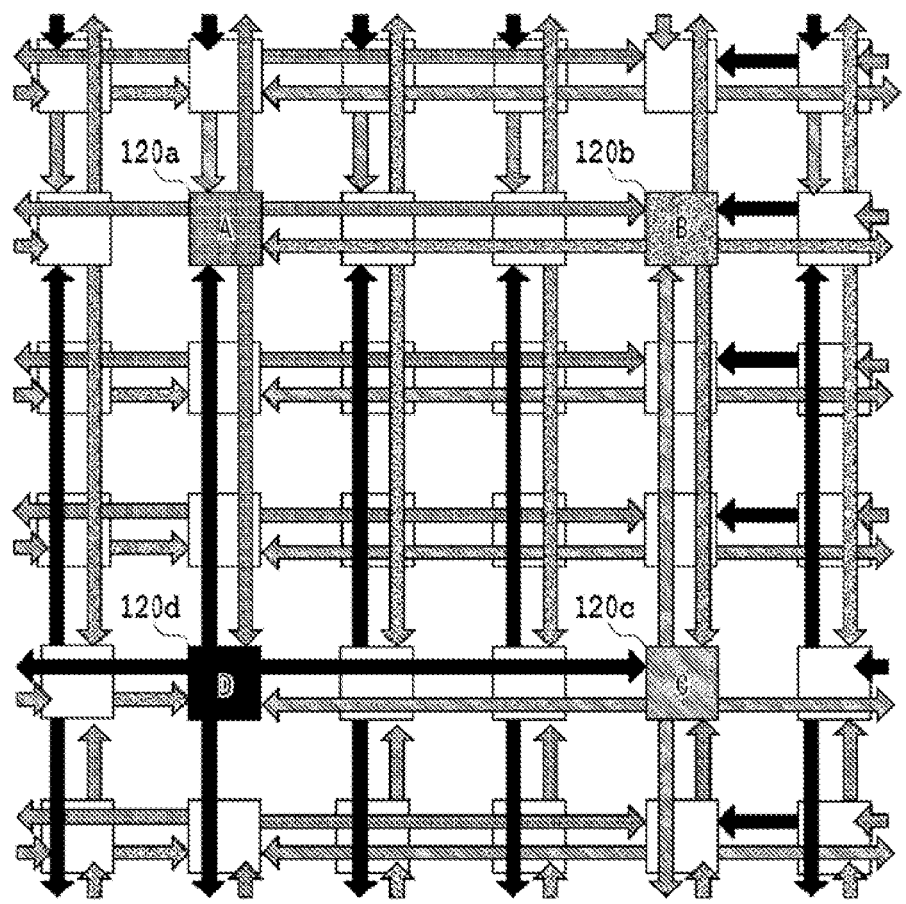
FIG. 12 is a diagram illustrating a route with the same wavelength in a 2-dimensional torus network.

FIG. 12 is a diagram illustrating a route with the same wavelength in a 2-dimensional torus network. In this optical network, the same wavelength λ1 is used for data flows from all the nodes A, B, C, and D (120a to 120d). In one torus network, six nodes are used and two of the six nodes use the same wavelength. Different types of arrow lines are used to identify routes from four different nodes. For example, when the node A is focused on, two independent ring networks including the node A are configured and a route further derived (branched) from the two ring networks is defined so that arrival at all the other nodes is possible.

Figure 13:
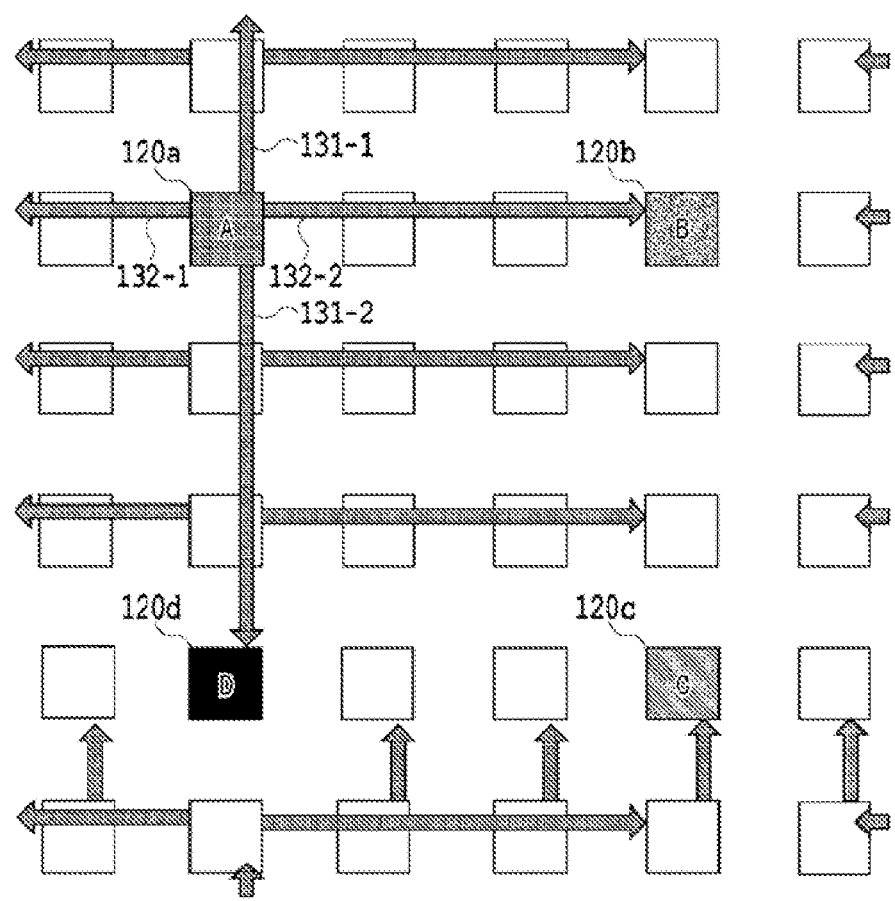
FIG. 13 is a diagram illustrating a route from a node A of the 2-dimensional torus network.

FIG. 13 is a diagram illustrating four routes 131-1 to 131-4 in which a node λ120a is an origin point among four nodes of the 2-dimensional torus network in FIG. 12 and routes further derived and defined from the four routes for simplicity. The routes from the node A to all the other nodes are set and arrival at all the nodes is possible.

Figure 14:
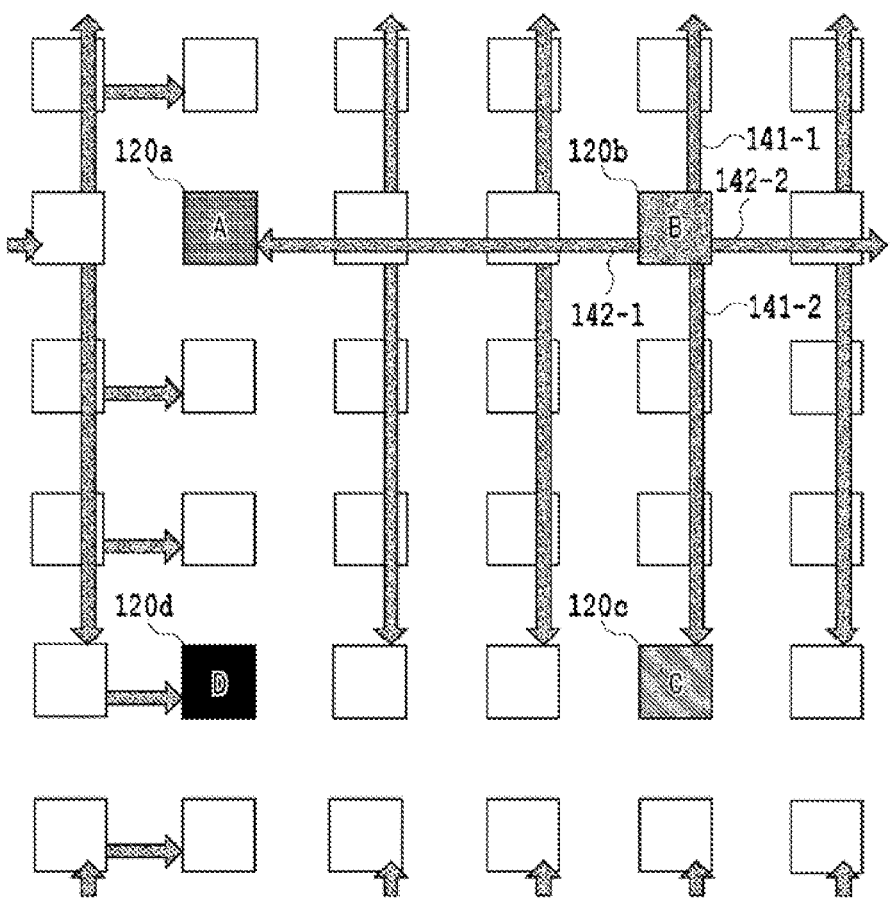
FIG. 14 is a diagram illustrating a route from a node B of the 2-dimensional torus network.
Figure 15:
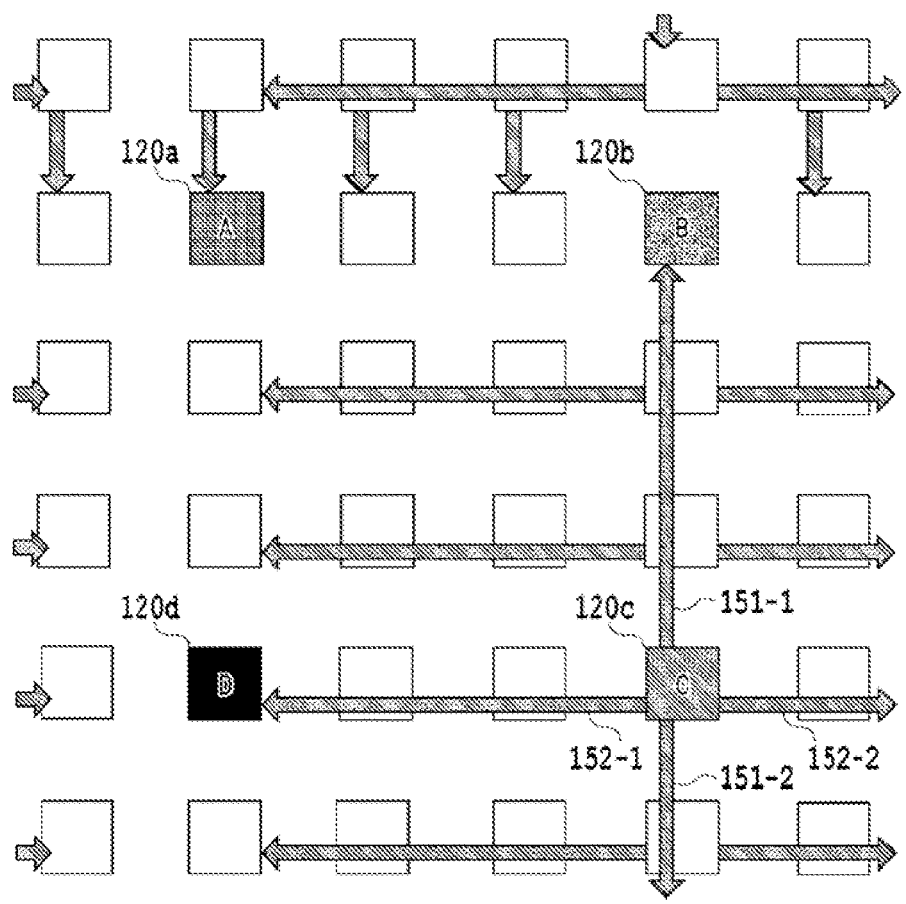
FIG. 15 is a diagram illustrating a route from a node C of the 2-dimensional torus network.
Figure 16:
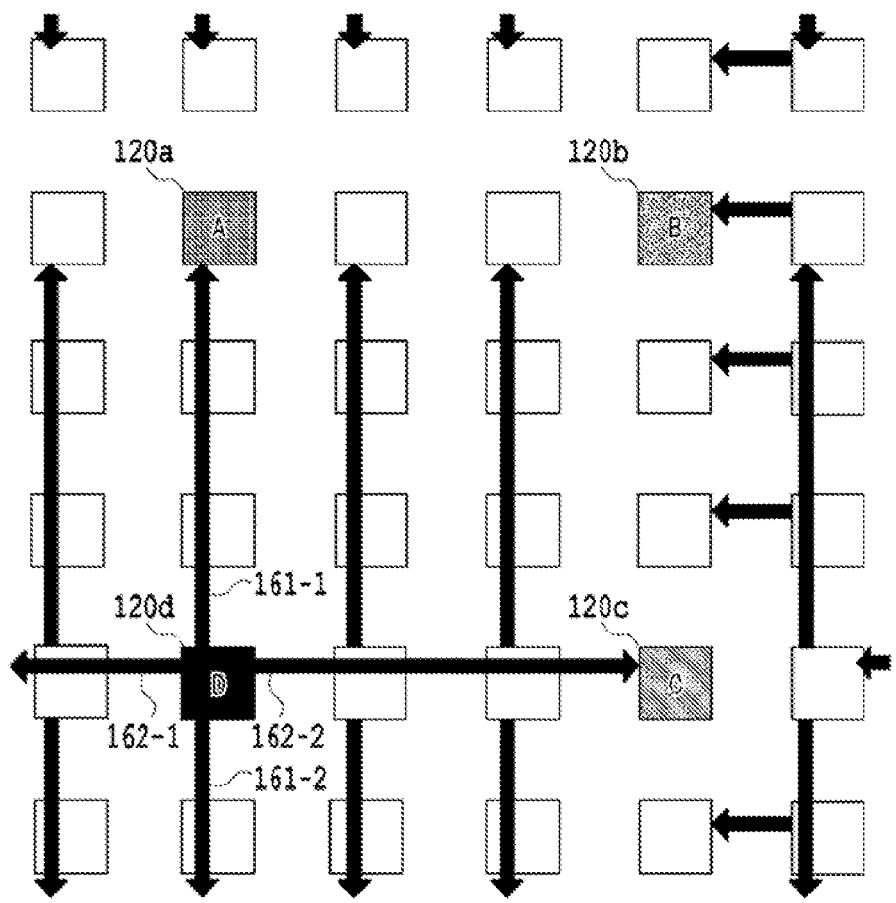
FIG. 16 is a diagram illustrating a route from a node D of the 2-dimensional torus network.

FIG. 14 is a diagram illustrating four routes 141-1 to 141-4 in which a node B120b of the 2-dimensional torus network in FIG. 12 is an origin point and routes further derived and defined from the four routes. Similarly, FIG. 15 is a diagram illustrating four routes 151-1 to 151-4 in which a node C120c of the 2-dimensional torus network in FIG. 12 is an origin point and routes further derived and defined from the four routes. Further, FIG. 16 is a diagram illustrating four routes 161-1 to 161-4 in which a node D120d of the 2-dimensional torus network in FIG. 12 is an origin point and routes further derived and defined from the four routes. When any node using the same wavelength λ1 in FIGS. 13 to 16 is focused on, the route along which the data flow from a different source node propagates in the opposite direction is defined so that the same wavelength can be repeatedly reused twice in one ring network of the torus topology.

Figure 17:
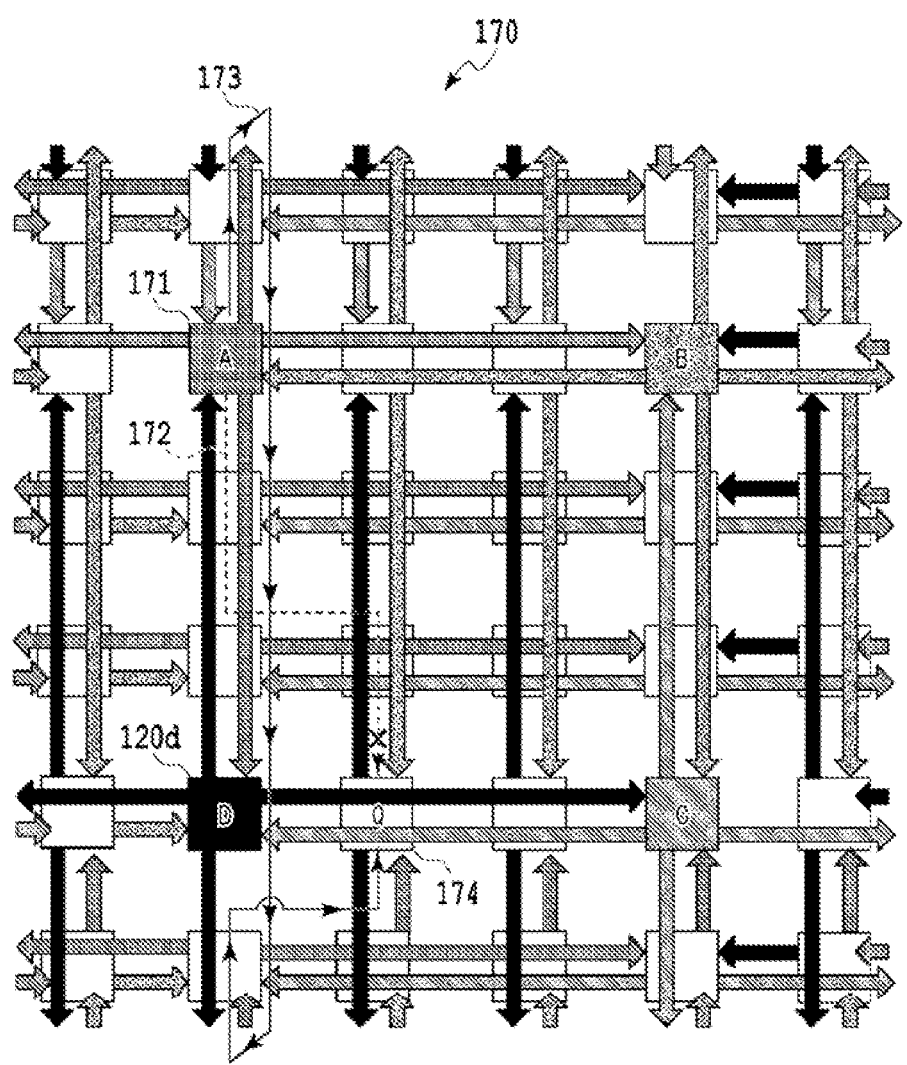
FIG. 17 is a diagram illustrating an example of a specific route along which a data flow is transmitted.

FIG. 17 is a diagram illustrating a specific route along which a data flow is transmitted from a source node to a destination node. In FIG. 17, the same 2-dimensional torus network 170 as that of FIG. 12 in which a data flow is sent from a node λ171 to a node Q174 will be considered. When the data flow is sent from the node A to the node Q, a route indicated by a dotted line 172 cannot be traced. This is because a part of the route 172 indicated by the dotted line has already been designated for the node B other than the node A. That is, a route in the vertical direction immediately before arrival at the node Q174 is a route defined for the node B. Accordingly, the route 172 cannot be taken. However, by tracking a route 173 indicated by a solid line instead of the route 172, a data flow can be sent to the node Q while tracking a route defined for the node A illustrated in FIG. 13 without facing the number of unnecessary hops. In this way, four nodes of the nodes A to D can transmit a data flow to any destination node of the 2-dimensional torus network 170 without collision. The same viewpoint can also be expanded to a higher dimensional network.

The torus network is used often to reduce the number of hops in a network in which there are many nodes. In the optical network according to the present invention, the torus network is introduced to repeatedly reuse the same wavelength. In the torus network, a direction of a data flow can strictly be defined and a route can be divided and defined in advance in two source nodes in a ring. Thus, the same wavelength can be used twice in one torus network. By further increasing the number of dimensions of the torus network, the number of times the same wavelength is repeatedly used increases in proportion to the number of dimensions.

When the dimensions N of the torus network increase, it should be noted that the optical switch of 1×2N ports is necessary in the optical switch unit (see FIG. 10) of each node. The optical switch in the optical switch unit operates to cut a specific data flow from the optical signals with the same wavelength on the time axis at a specific timing based on the label information. The optical switch can be realized by a high-speed optical switch of InP, or the like. However, a maximum number of the number of ports (a base number of switches) is limited to about eight at present because of an increase in an insertion loss, a problem of polarization dependency, deterioration in a signal waveform, or the like. Accordingly, there is a limitation on a reduction in the number of necessary wavelengths by reuse of the same wavelength in large scalability of the torus topology.

In the subsequent third embodiment, a new reduction of the number of wavelengths A is realized by parallelizing networks as a second idea in addition to use of the torus network.

Third Embodiment

Figure 18:
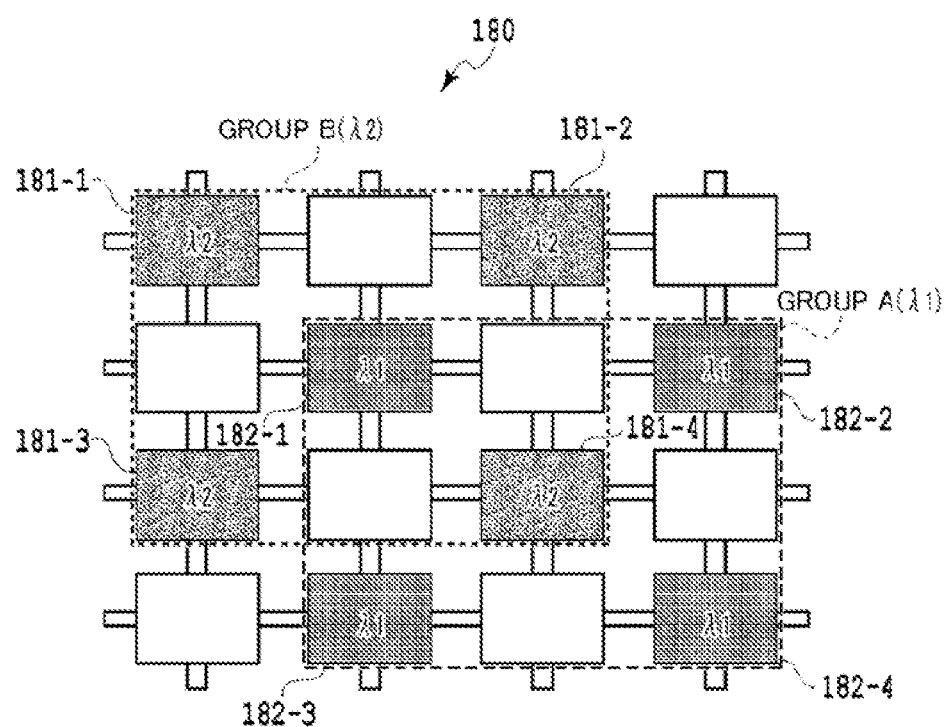
FIG. 18 is a diagram illustrating a structure for reducing the number of wavelengths by parallelization of networks.

FIG. 18 is a diagram illustrating a structure for further reducing the number of wavelengths by parallelization of optical networks. FIG. 18 illustrates a state in which a wavelength is reused because of only application of the 2-dimensional torus network according to the second embodiment before the parallelization of the optical networks is applied. A 2-dimensional torus network 180 includes four nodes in each torus network of row (the vertical direction) and also includes four nodes in each torus network in a column (the horizontal direction). Four nodes of nodes 181-1 to 181-4 use the same wavelength λ1 four times and are referred to as a group A. Four nodes of nodes 182-1 to 182-4 also use the same wavelength λ2 four times and are referred to as a group B. In the optical network according to the embodiment, the number of wavelength is further reduced using one common wavelength by parallelizing optical fibers between a first group in which the wavelength λ1 is repeated and a second group in which another wavelength λ2 is repeated.

Figure 19:
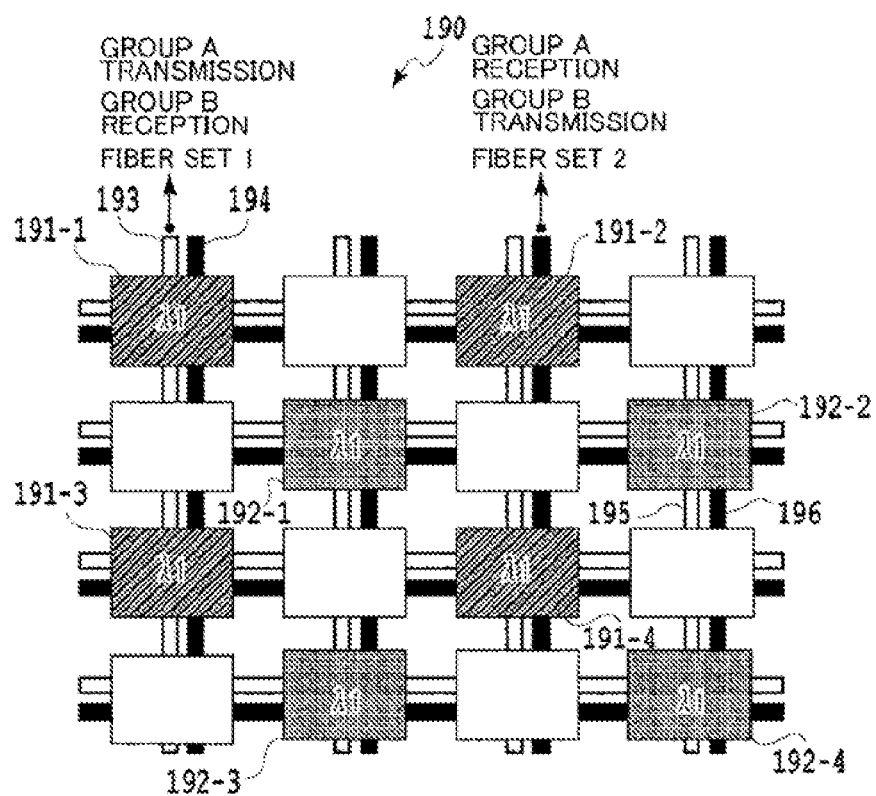
FIG. 19 is a diagram illustrating a configuration of an optical network according to a third embodiment of the present invention.

FIG. 19 is a diagram illustrating a configuration of an optical network and wavelength deployment according to the third embodiment. A first change point from the optical network of FIG. 18 serving as a base is a point at which optical transmission routes connecting nodes to each other, that is, optical fibers, are parallelized. When existing optical fibers connecting all the nodes to each other in FIG. 18 is set as a first set 193, a second set 194 of new optical fibers can be added in parallel to each node. In the 2-dimensional torus network, each node has four input ports. In the optical network according to the embodiment, a pair of optical fibers (two) is connected to each port in any node.

A second change point is a point at which an operation is limited to only one of transmission and reception of a data flow for each group in each node from the viewpoint of one fiber set. Specifically, four nodes 191-1 to 191-4 of the group A are permitted to transmit the data flows with the wavelength λ1 over the optical fibers of the first set 193. On the other hand, four nodes 192-1 to 192-4 of the group B are permitted to only receive data flows over the optical fibers of the first set 195.

On the other hand, when the optical fibers of the second set 194 are used, the four nodes 192-1 to 192-4 of the group B transmit the data flows with the common wavelength λ1 to the first set rather than λ2 over the optical fibers of the second set 194. However, the four nodes 191-1 to 191-4 of the group A are permitted to only receive the data flows over the optical fibers of the second set 196. In this way, one optical fiber set is used for only one function between the transmission and the reception of the data flows for every two groups. In the other optical fiber sets, the same wavelength can be used consistently in two groups by reversing the transmission and reception functions. In the nodes except for the eight nodes 191-1 to 191-4 and 192-1 to 192-4 displayed with λ1 in FIG. 19, another wavelength λ2 may be used. Accordingly, in the 2-dimensional torus network 190 illustrated in FIG. 19, it can be understood that all the nodes are covered with two wavelengths of λ1 and λ2.

The parallelization of the optical fiber sets can be expanded to more optical fiber sets. For example, when the number of nodes in a ring is more, for example, N=64 (8×8) in the 2-dimensional torus network, the nodes can be divided into four groups. At this time, the optical fibers can be parallelized to be included in four sets. The optical fibers of the four sets are connected to each node. Although not described in detail herein, the transmission and reception functions of the nodes can be determined in advance and the nodes can be grouped so that the data flows do not collide for every four optical fiber. In the groups, one wavelength can be repeatedly reused.

Accordingly, the configuration of the optical network according to the third embodiment can be embodied by satisfying each of the following requirements. Here, a first requirement is that a plurality of optical nodes are connected in parallel by P optical fiber sets in a K-dimensional torus topology. A second requirement is that the plurality of optical nodes include P groups and each of the P groups is formed by the optical nodes belonging to the same ring of each K-dimensional torus network. A third requirement is that the optical nodes in different rings are included between the P groups without duplication in all the plurality of optical nodes. A fourth requirement is that the optical nodes belonging to one of the P groups perform only transmission of the data flows in one of the P optical fiber sets. A fifth requirement is that the optical nodes belonging to the remaining groups except for the one group perform only reception of the data flows over the optical fibers of the remaining sets except for the one set. According to these requirements, the configuration of the optical network according to the third embodiment can be embodied by using $N/(2K \cdot P)$ (an integer) wavelengths in the plurality of optical nodes.

Compared to the configuration of FIG. 19, the plurality of optical nodes are connected via 2(P) optical fiber sets in parallel, that is, set 1 and set 2, in a 2(P) dimensional torus topology. The plurality of optical nodes include 2(P) groups, that is, the groups A and B, and each of the two groups is formed by the optical nodes belonging to the same ring of each K-dimensional torus network. The four nodes 191-1 to 191-4 belong to any same ring in two dimensions. The same applies to the four nodes 192-1 to 192-4.

However, between the two groups, that is, the groups A and B, the optical nodes in different rings are included without duplication in all the plurality of optical nodes. The optical nodes belonging to one group (the group A) of the two groups perform only transmission of the data flows in one set (for example, set 1) of the two optical fiber sets and the optical nodes belonging to the remaining group (the group B) except for the one group perform only reception of the data flows over the optical fibers of the remaining set (set 2) except for the one set.

In the plurality of optical nodes, $N/(2K \cdot P)$ (an integer) wavelengths are used, that is, $16/(2 \times 2 \cdot 2)=2$ wavelengths $\lambda 1$ and $\lambda 2$ are used in the entire network of FIG. 19 including the groups A and B.

As described above, the number of wavelengths necessary for N nodes is $N/(2K \cdot P)$. Here, P is the number of parallelized optical fiber sets. P is also the number of groups in which the same wavelength is simultaneously used. In a combination of N, K, and P in which the number of wavelengths is an integer, the nodes according to the third embodiment can be configured. That is, the number of dimensions of different torus networks and the number of parallelizations of the different optical fiber sets (the number of groups) P can independently be applied. In each node, because of an increase in the number of fibers per port, accurate balance is kept by reducing the number of wavelengths A in the entire network. Accordingly, the change in the number P of parallelized optical fiber sets does not have an influence on the transmitters, the receivers, the switches, and a base number of the switches (the number of ports).

Figure 20:
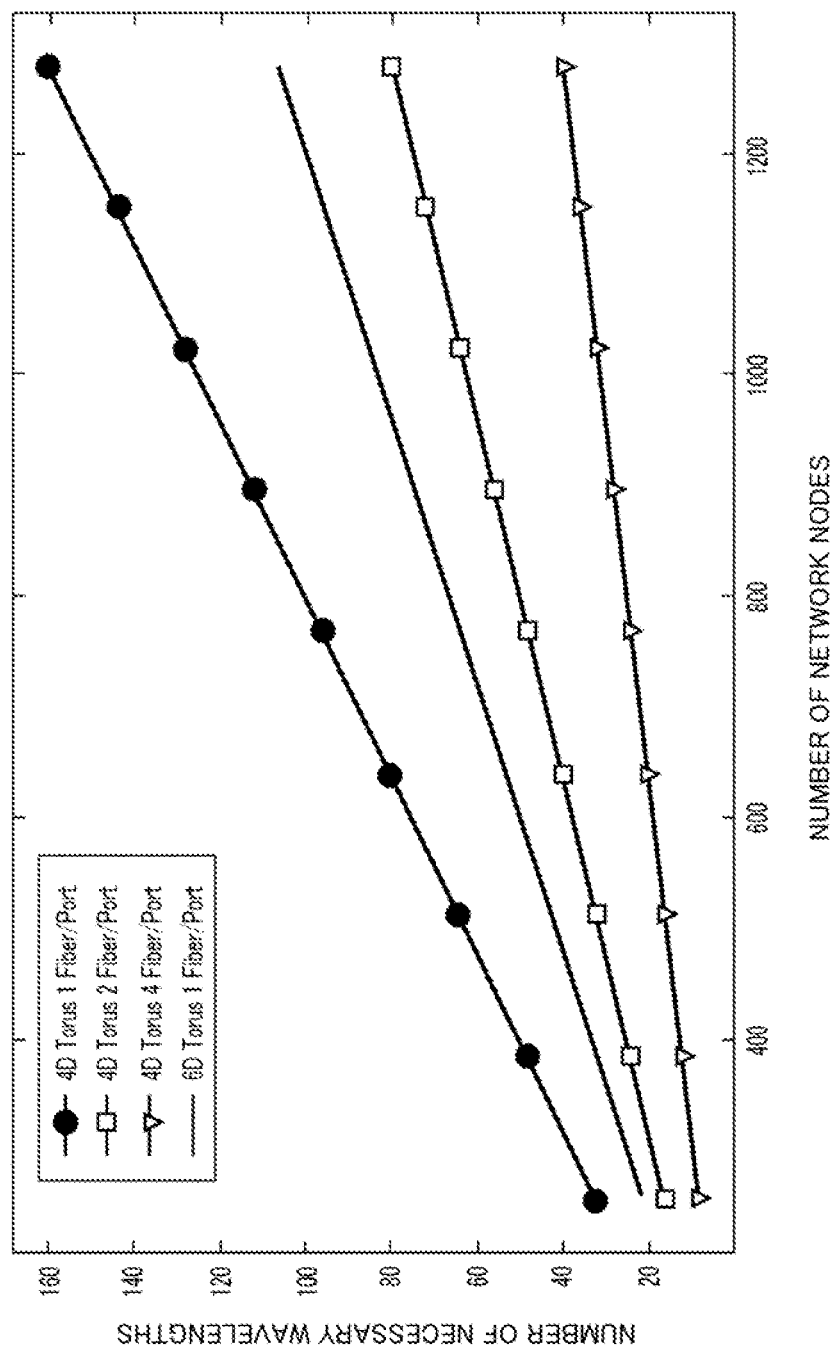
FIG. 20 is a graph illustrating the number of wavelengths in the number of parallelizations in differential dimensions in an optical network according to the present invention.

FIG. 20 is a graph illustrating a relation of the number of necessary wavelengths in different configurations (number of dimensions and the number of parallelizations of optical fibers) in the optical network according to the present invention. In FIG. 20, a relation between a total number of nodes of an optical network and the number of necessary wavelengths is shown in comparison with four combinations of the number of dimensions of the torus networks and the number of parallelized optical fiber sets connected to each node. When optical fibers are not parallelized in a 6D torus network (in the second embodiment, K=6 and P=1), the number of required wavelengths is about 60 despite the number of nodes of 1000. Accordingly, it can be understood that the number of wavelengths of the present C band suffices. When the number of parallelizations of optical fibers is 4 in a 4D torus network (in the third embodiment, K=4 and P=4), the number of required wavelengths is equal to or less than 30 despite the number of nodes of 1000.

In a 4-dimensional network in which a pair of optical fibers are used for each port, 1024 nodes are supported with 64 wavelengths. In the entire network, up to 1024×1024 switches capable of transmitting the data flows without scheduling can be used until a state in which all the receivers usable in the nodes are completely used. Accordingly, the optical network according to the present invention can also be handled for a large scalable network used at present such as a DC network or a supercomputer network.

FIG. 21 is a table that shows network items in different dimensions of torus networks for comparison. Here, it is clarified that the number of wavelengths of the C band can correspond to the number of nodes of 1024 in the 6-dimensional torus network. In the table of FIG. 21, a case is assumed in which there are four nodes for each dimension and an occupancy ratio (a use ratio) of all the nodes of $4^6$ (4096) is ¼ (25%) in the 6-dimensional (6D) network, and the number of corresponding nodes is set to 1024.

The DC network in which the dedicated wavelengths are used as a basis according to the present invention can be mostly realized by an arrayed-waveguide grating (AWG) and a wavelength-variable light source although not used in the above-described embodiments. Accordingly, without restriction of a resolution of the AWG or a problem of wavelength drift occurring due to channel multiplexing, an optical network including more nodes can be realized while considerably reducing the number of wavelengths. Further, another advantage of the optical network according to the present invention is compatibility performance with other systems capable of simultaneously supporting other optical transmission schemes of the OCS and OPS by using different wavelengths. That is, in the optical network (the optical transmission system) according to the present invention, other optical transmission schemes including at least one of the optical circuit switching (OCS), the optical packet switching (OPS), and the optical burst switching (OBS) can be supported with wavelengths other than the foregoing reserved dedicated wavelengths.

In the optical network according to the present invention, the wavelengths can be frequently changed or the configuration of the routes pre-defined in the second embodiment can be flexibly changed in the configuration of the number of ports of the optical switch in the BM receiver or within the range of the number of receivers. Such features can be appropriately applied to a supercomputer network for which an optimum communication network topology can be selected in accordance with the properties of tasks to be performed. That is, according to the present invention, it is possible to realize the optical network in which it is possible to easily perform the reconfiguration and dynamically change.

The present invention can be implemented as an optical node. That is, the present invention can be implemented as an optical node that includes an optical transmitter transmitting a data flow to a destination node by using a reserved dedicated wavelength corresponding to an optical node used in an optical transmission system and an optical receiver decoding label information assigned to the data flow in immediate synchronization with the data flows of the other optical nodes from a non-signal state and performing transmission switching based on the label information.

As described in the second embodiment, the optical node is one of the plurality of optical nodes included in the optical transmission system. The plurality of optical nodes include K (a natural number)-dimensional torus topology. The same wavelength is reused for two different optical nodes within a ring including the optical node and each route to other optical nodes is pre-defined so that duplication does not occur in the same direction for the two optical nodes. The same wavelength is reused N/2K (an integer) times for all the plurality of optical nodes.

As illustrated in FIG. 8, the optical receiver of the optical node includes the following elements. Here, the elements include a plurality of label processors processing the label information to correspond to different wavelengths, an optical switch dropping the data flow coming from another optical node to the optical node or transmitting the data flow to another optical node based on the label information, and a selection switch that guides the dropped data flow to a predetermined number of burst mode (BM) receivers.

As described above, in the optical network according to the present invention, a single wavelength channel or a plurality of channels of other wavelengths can be assigned to each network node to transmit data. However, a group of wavelength channels treated as a single unit can be allocated to a node characterized with a high traffic amount. In this case, a single label can also be assigned to the entire group instead of assigning different labels to other wavelength channels as in the related art. In this case, the switching node may also be corrected to handle the grouped traffics beyond a bandwidth (channel) of a fixed wavelength grid. Accordingly, the basic concepts of the present invention described in the first embodiment are not limited to an optical network and an optical communication system with a channel configuration of a band for existing optical communication.

As described above in detail, in the optical transmission system according to the present invention, it is possible to considerably reduce the number of used wavelengths in a DC network and a supercomputer network including many optical nodes. In addition to a considerable reduction in network resources and resolution of the problems of collision or delay in the optical transmission scheme in the related art, it is possible to perform all the processing at optical levels and considerably reduce power consumption in a network. The configuration of the network can be flexibly changed through the use of the dedicated wavelength and processing using the label information.

INDUSTRIAL APPLICABILITY

The present invention can be generally used for a communication system. In particular, the present invention can be used for an optical communication system.

REFERENCE SIGNS LIST 1, 50, 60 Optical network
4a to 4e, 32, 33, 53, 65, 65a, 65b, 71-1 to 71-8, 80, 111-1, 111-2, 112-1 to 112-4, 113-1 to 113-6, 120a to 120d, 181-1 to 181-4, 182-1 to 182-4, 191-1 to 191-4, 192-1 to 192-4 Optical node
5, 6 Server
7, 8, 86, 105a, 105b, 106a, 106b Data flow
51, 62 Optical switch
61, 81a, 81b Label processor
70 Ring network
80-1, 90 Optical switch unit
82 Switching controller
83a, 83b Label information
85a, 85b, 103a, 103b Optical switch
87, 107 Receiver selection SW
88 BM receiver
92a, 92b, 101a, 101b Optical fiber
93-1, 93-2, . . . , 93-N Optical switch circuit
102a, 102b Optical isolator
170, 180, 190 2-dimensional torus network

The invention claimed is:

1. An optical transmission system that includes a plurality (N: an integer) of optical nodes, wherein each of the plurality of optical nodes transmits a data flow to a destination node by using a corresponding reserved dedicated wavelength and performs transmission switching on a data flow coming from another optical node based on label information assigned to the data flow,
wherein the plurality of optical nodes have a K (a natural number)-dimensional torus topology, wherein each of the plurality of optical nodes reuses the same wavelength for two different optical nodes within a ring including the optical node and each route to other optical nodes is pre-defined so that duplication does not occur in the same direction for the two optical nodes, and wherein the same wavelength is reused N/2K (an integer) times for all the plurality of optical nodes.

2. The optical transmission system according to claim 1, wherein each of the plurality of optical nodes includes 2K optical transmitters as source nodes to transmit the data flow to other optical nodes via the pre-defined routes.

3. The optical transmission system according to claim 1, wherein the plurality of optical nodes are connected in parallel by P optical fiber sets in accordance with the K-dimensional torus topology, wherein the plurality of optical nodes include P groups, wherein each of the P groups is formed by the optical nodes belonging to the same ring of each K-dimensional torus network, wherein, between the P groups, the optical nodes of the other rings are included without duplication in all the plurality of optical nodes, wherein the optical nodes belonging to one group among the P groups only transmit the data flows in one set among the P optical fiber sets, wherein the optical nodes belonging to the remaining groups except for the one group only receive the data flows via optical fibers of the remaining sets except for the one set, and wherein N/(2K·P) (an integer) wavelengths are used for the plurality of optical nodes.

4. The optical transmission system according to claim 1, wherein each of the plurality of optical nodes includes an optical receiver that is able to decode the label information in immediate synchronization with an input of the data flow in a non-signal state.

5. The optical transmission system according to claim 1, wherein a plurality of dedicated wavelength sets are grouped together and a single label is assigned to a data flow for which the plurality of dedicated wavelength sets are used.

6. The optical transmission system according to claim 1, wherein other optical transmission schemes including at least one of optical circuit switching (OCS), optical packet switching (OPS), and optical burst switching (OBS) are supported with wavelengths other than the reserved dedicated wavelengths.

7. An optical transmission system that includes a plurality (N: an integer) of optical nodes, wherein each of the plurality of optical nodes transmits a data flow to a destination node by using a corresponding reserved dedicated wavelength and performs transmission switching on a data flow coming from another optical node based on label information assigned to the data flow, wherein each of the plurality of optical nodes includes an optical receiver that is able to decode the label information in immediate synchronization with an input of the data flow in a non-signal state, and wherein the optical receiver includes a plurality of label processors that process the label information to correspond to different wavelengths, an optical switch that drops the data flow coming from the other optical nodes to the optical node or transmits the data flow to the other optical nodes based on the label information, and a selection switch that guides the dropped data flow to a predetermined number of burst mode (BM) receivers.

8. The optical transmission system according to claim 7, wherein, when the BM receivers are completely occupied, the optical node delays communication or transmits a switching request to other optical nodes by using another transmission scheme.

9. The optical transmission system according to claim 7, wherein a plurality of dedicated wavelength sets are grouped together and a single label is assigned to a data flow for which the plurality of dedicated wavelength sets are used.

10. The optical transmission system according to claim 7, wherein other optical transmission schemes including at least one of optical circuit switching (OCS), optical packet switching (OPS), and optical burst switching (OBS) are supported with wavelengths other than the reserved dedicated wavelengths.

11. An optical node used in an optical transmission system, the optical node comprising:

an optical transmitter configured to transmit a data flow to a destination node by using a reserved dedicated wavelength corresponding to the optical node; and an optical receiver configured to decode label information assigned to the data flow in immediate synchronization with a data flow coming from another optical node in a non-signal state and perform transmission switching based on the label information, wherein the optical node is one of a plurality of optical nodes included in the optical transmission system and a plurality of the optical nodes have a K (a natural number)-dimensional torus topology, wherein each of the plurality of optical nodes reuses the same wavelength for two different optical nodes within a ring including the optical node and each route to other optical nodes is pre-defined so that duplication does not occur in the same direction for the two optical nodes, and wherein the same wavelength is reused N/2K (an integer) times for all the plurality of optical nodes.

12. The optical node according to claim 11, wherein the data flow is transmitted to other optical nodes via the pre-defined routes by 2K optical transmitters.

13. The optical node according to claim 11, wherein the plurality of optical nodes are connected in parallel by P optical fiber sets in accordance with the K-dimensional torus topology, wherein the optical node and the plurality of optical nodes include P groups, wherein each of the P groups is formed by the optical nodes belonging to the same ring of each K-dimensional torus network, wherein, between the P groups, the optical nodes of the other rings are included without duplication in the all the plurality of optical nodes, wherein the optical nodes belonging to one group among the P groups only transmit the data flows in one set among the P optical fiber sets, wherein the optical nodes belonging to the remaining groups except for the one group only receive the data flows via optical fibers of the remaining sets except for the one set, and wherein N/(2K·P) (an integer) wavelengths are used for the plurality of optical nodes.

14. The optical node according to claim 11, wherein the optical receiver includes:

a plurality of label processors that process the label information to correspond to different wavelengths;

an optical switch that drops the data flow coming from the other optical nodes to the optical node or transmits the data flow to the other optical nodes based on the label information; and a selection switch that guides the dropped data flow to a predetermined number of burst mode (BM) receivers.

* * * * *